US012245592B2

(12) United States Patent
Wallstroem

(10) Patent No.: US 12,245,592 B2
(45) Date of Patent: Mar. 11, 2025

(54) ENCAPSULATED BIOCIDES AND BIOREPELLENTS

(71) Applicant: Aerogel ApS, Copenhagen (DK)

(72) Inventor: Eva Wallstroem, Copenhagen (DK)

(73) Assignee: Aerogel ApS, Copenhagen (DK)

( * ) Notice: Subject to any disclaimer, the term of this patent is extended or adjusted under 35 U.S.C. 154(b) by 162 days.

(21) Appl. No.: 17/525,025

(22) Filed: Nov. 12, 2021

(65) Prior Publication Data

US 2022/0079162 A1 Mar. 17, 2022

Related U.S. Application Data

(63) Continuation of application No. 17/255,303, filed as application No. PCT/EP2019/067445 on Jun. 28, 2019.

(30) Foreign Application Priority Data

Jun. 29, 2018 (EP) .................................... 18180787

(51) Int. Cl.
| *A01N 59/20* | (2006.01) |
| *A01N 25/04* | (2006.01) |
| *A01N 25/08* | (2006.01) |
| *A01N 43/40* | (2006.01) |
| *A01N 59/16* | (2006.01) |
| *A01P 1/00* | (2006.01) |
| *A01P 3/00* | (2006.01) |
| *A01P 17/00* | (2006.01) |
| *C09D 5/14* | (2006.01) |
| *C09D 5/16* | (2006.01) |

(52) U.S. Cl.
CPC ............ *A01N 59/20* (2013.01); *A01N 25/04* (2013.01); *A01N 25/08* (2013.01); *A01N 43/40* (2013.01); *A01N 59/16* (2013.01); *A01P 1/00* (2021.08); *A01P 3/00* (2021.08); *A01P 17/00* (2021.08); *C09D 5/14* (2013.01); *C09D 5/1687* (2013.01)

(58) Field of Classification Search
CPC ........ C09D 5/14; C09D 5/1687; A01N 25/08; A01N 25/10
See application file for complete search history.

(56) References Cited

U.S. PATENT DOCUMENTS

| 2010/0269731 A1* | 10/2010 | Tofte Jespersen ... B01J 13/0091 |
| | | 106/18.32 |
| 2012/0312192 A1 | 12/2012 | Detty et al. |
| 2013/0209389 A1 | 8/2013 | Tofte et al. |
| 2014/0242403 A1 | 8/2014 | Olsen et al. |
| 2021/0368804 A1* | 12/2021 | Wallstroem ............ A01N 25/04 |

FOREIGN PATENT DOCUMENTS

| CN | 1232610 | 10/1999 |
| CN | 102137900 | 7/2011 |
| CN | 102575205 | 7/2012 |
| CN | 102816469 | 12/2012 |
| CN | 103189454 | 7/2013 |
| CN | 103857754 | 6/2014 |
| CN | 107793083 | 3/2018 |
| EP | 2130877 | 12/2009 |
| FR | 2968666 | 6/2012 |
| JP | 2002-338405 | 11/2002 |
| JP | 2006-213783 | 8/2006 |
| WO | WO2009062975 | 5/2009 |
| WO | WO 2017010459 | 1/2017 |
| WO | WO 2019033199 | 2/2019 |

OTHER PUBLICATIONS

Wallstroem et al., "Lystbadmaling med minimeret biocidinhold," Effektivtetsafprovning Pa Lystbade, 2015, 66 pages—machine translation, 151 pages.*
Machine translation of FR 2968666 A1, Jun. 15, 2012.*
European Search Report in EP Appln. No. 18180787.6, dated Oct. 8, 2018, 9 pages.
PCT International Preliminary Report on Patentability in International Appln. No. PCT/EP2019/067445, dated Dec. 29, 2020, 6 pages.
PCT International Search Report and Written Opinion in International Appln. No. PCT/EP2019/067445, dated Sep. 24, 2019, 9 pages.
Wallstrom et al., "A new concept for anti-fouling paint for Yachts", Progress in Organic Coatings, Mar. 2011, 6 pages.
Wallstrom et al., "Lystbadmaling med minimeret biocidindhold", Effektivitetsafprovning Pa Lystbade, 2015, 66 pages.
Almond et al., "The effects of copper pyrithione, an antifouling agent, on developing zebrafish embryos," Ecotoxicology, 2016, 25(2):389-398.
CAS No. 122454-29-9, "Tralopyril," retrieved on Mar. 4, 2024, retrieved from URL<https://echa.europa.eu/substance-information/-/substanceinfo/100.125.440>, 3 pages.

(Continued)

Primary Examiner — Vickey Nerangis
(74) Attorney, Agent, or Firm — Fish & Richardson P.C.

(57) ABSTRACT

The present invention relates to silica aerogels with a high to very high loading (60-90% w/w) of encapsulated biocidal and/or biorepellant compounds and to methods of making and using such aerogels in anti-fouling compositions, which are especially suitable for marine use.

20 Claims, 14 Drawing Sheets

(56) References Cited

OTHER PUBLICATIONS economist.com [online], "Reducing the barnacle bill, " The Economist Technology Quarterly Q3 2011, Sep. 3, 2011, Retrieved on Mar. 4, 2023, retrieved from URL<https://www.economist.com/technology-quarterly/2011/09/03/reducing-the-barnacle-bill>, 4 pages.

Jämsä et al., "Slow release of a biocidal agent from polymeric microcapsules for preventing biodeterioration," Progress in Organic Coatings, Jan. 2013, 76(1):269- 276.

Kamtsikakis et al., "Encapsulation of Antifouling Organic Biocides in Poly(lactic acid) Nanoparticles," Bioengineering, Sep. 2017, 4(4), 81, 18 pages.

Wallstroem et al., "Yacht paint with minimised biocide content", Report in Danish from the Danish Ministry of Environment, Environmental Project No. 1663, 2015, 134 pages (with Machine English translation).

Xiao et al., "Research progress on green antifouling on hull surface based on low surface energy design," Ship Engineering, 2017, 39(3):25-30 (Abstract with English translation).

yachtingmonthly.com [online], "What happens when they ban antifoul?," Feb. 4, 2016, retrieved on Mar. 4, 2024, retrieved from URL<https://www.yachtingmonthly.com/gear/what-happens-when-they-ban-antifoul-34343>, 15 pages.

Yu et al., "Biomimetic transparent and superhydrophobic coatings: from nature and beyond nature," Chemical Communications, Feb. 2015, 51(10):1775-1794.

Extended European Search Report in European Appln. No. 21169564.8, mailed on Nov. 2, 2021, 7 pages.

* cited by examiner

Aerogel particles with encapsulated biocide

Paint base with binder

● Biocide (e.g. CuP) particles

FIG. 4

Initial paint film

↓

Increasing polishing

- Aerogel particle with encapsulated biocide (eg CuP) particles.
- Aerogel particle with initial swelling and dissolution of biocide.

FIG. 5

| Active substance | EC no. | CAS no. | Density gr/cm³ | Solubility in water, 20 °C | Target organisms | |
|---|---|---|---|---|---|---|
| | | | | | Soft fouling | Hard fouling |
| Tolyolfluanid | 211-986-9 | 731-27-1 | 1,52 | 0.9 mg/l | Fungi, algae | |
| Dichlorfluanid | 214-118-70 | 1085-98-90 | 1,55 | 1.2 mg/l | Bacteria, fungi, algae | |
| Zinc pyrithione | 236-671-3 | 13463-41-7 | 1,78 | 0.008 gr/l | Bacteria, fungi, algae | Barnacles at high concentrations |
| Copper pyrithione | 238-984-0 | 14915-37-8 | 1,82 | <0.001 gr/l | Bacteria, fungi, algae | Barnacles at high concentrations |
| Copper thiocyanate | 214-183-1 | 1111-67-7 | 2,84 | $8.4 \times 10^{-6}$ gr/l | | Barnacles, mussels (CAEP 2012) |
| DCOIT = 4,5-Dichloro-2-octyl-4-isothiazolin-3-one (= Sea-Nine) | 264-843-8 | 64359-81-5 | 1,28 | 6.5 mg/l | Bacteria, fungi, algae | Barnacles (Norway 2010) |
| Zineb = (Zn[S2CN(H)CH2CH2N(H)CS2])n =Zinc ethylenebisthiocarbamate | 235-180-1 | 12122-67-7 | 0,78 | <0.010 gr/l | Bacteria, fungi, algae | Barnacles (Ireland 2011) |
| Econea = 2-(p-chlorophenyl)-3-cyano-4-bromo-5-trifluoromethyl pyrrole = Tralopyril | | 122454-29-9 | 1,714 | 0,17 mg/l | | Barnacles, polychaete tubeworms, and bivalve mollusks to ascidians, hydroids, bryozoans and sponges |

FIG. 9

| Gel | Process conditions | Batch | Biocide by TGA (w/w%) | Porosity (%) | Bulk density (gr/ml) | App. Density (gr/ml) | Intrusion vol. (ml/g) | Oil no. | Specific surface area (m2/g) |
|---|---|---|---|---|---|---|---|---|---|
| ZnP, 75% | Normal silicate, intense blending, gelling time 14 min | 1A | 78 | 63.21 | 0.580 | 1.576 | 1.09 | 104.7 | |
| ZnP, 75% | Normal silicate, ordinary blending, gelling time 14 min | 1B | 75 | 64.94 | 0.644 | 1.325 | 1.40 | 73.4 | 169.6 |
| ZnP, 75% | Normal silicate, ord. blending reduced amt. of ammonia, gelling time 30 min | 1C | 78 | 62.62 | 0.533 | 1.426 | 1.17 | 66.8 | N.A. |
| ZnP, 75% | Pre-condensated TMOS + red. amount of ammonia | 2A | 79 | 66.38 | 0.383 | 1.140 | 1.73 | 77.0 | 152.1 |
| ZnP, 75% | Pre-condensated TMOS + red. amount of ammonia | 2B | 77 | 67.59 | 0.396 | 1.223 | 1.71 | 70.0 | 162.3 |
| CuP, 75% | Normal silicate, ordinary blending | 3A | 75 | 66.20 | 0.352 | 1.040 | 3.20 | 68.0 | 155.9 |
| CuP, 75% | Pre-condensated TMOS | 3B | 76 | 63.90 | 0.485 | 1.380 | 2.39 | 62.4 | 175.75 |
| CuP, 75% | Pre-condensated TMOS process scaled up | 3C | 77 | 64.90 | 0.416 | 1.180 | 2.61 | 64.8 | tbd |
| CuP, 75% | Pre-condensated TMOS | 3D | 76 | 69.80 | 0.335 | 1.110 | 3.43 | 68.9 | tbd |
| Econea, 75% | Pre-condensated TMOS | 4A | 62 | 40.80 | 0.726 | 1.230 | 0.72 | 50.2 | 139.09 |
| Econea, 75% | Normal silicate, ordinary blending | 4B | 65 | 42.70 | 0.686 | 1.190 | 0.79 | 56.5 | 158.60 |
| Cu-thiocyanate 75% | Pre-condensated TMOS | 5 | N.A. | 48.70 | 0.748 | 1.460 | 0.88 | 50.8 | 176.58 |

FIG. 14

ENCAPSULATED BIOCIDES AND BIOREPELLENTS

CROSS-REFERENCE TO RELATED APPLICATIONS

This application is a continuation application of and claims priority to U.S. application Ser. No. 17/255,303, filed on Dec. 22, 2020 which is a U.S. National Phase application under 35 U.S.C. § 371 of International Patent Application No PCT/EP2019/067445, filed on Jun. 28, 2019, which claims the priority of European Patent Application No. 18180787.6, filed on Jun. 29, 2018, the disclosure of which is incorporated herein by reference in its entirety.

FIELD OF THE INVENTION

The present invention relates to silica aerogels with a high to very high loading (60-90% w/w) of encapsulated biocidal and/or biorepellant compounds and to methods of making and using such aerogels in anti-fouling compositions, which are especially suitable for marine use.

BACKGROUND OF THE INVENTION

Biocides and biorepellents are substances that are used to prevent unwanted growth of biological organisms from buildings, installations, or other areas. Biocides and biorepellents are typically added to products such as protective coatings, paints and lacquers which may be applied to areas susceptible to such unwanted growth.

Protective coatings applied for exterior or interior use typically have two basic functions, protection, and decoration. Attack of biological organisms such as e.g. fungi and algae—either in the wet state or at the painted surface—can impair both the protection rendered by the paint film and its decorative effect.

Ship surfaces exposed to seawater present a special problem as they are inclined to settlement of microorganisms, plants, algae, and animals, thereby increasing the propulsion resistance of the vessel and hence reducing speed or increasing fuel consumption. This biological process is termed fouling and can be classified in two broad groups: Microfouling, which includes colonies of unicellular algae and bacteria, often referred to as "slime", and Macrofouling, which includes both plant (weed) and animal fouling. Especially Macrofouling pose problems in relation to propulsion resistance.

The propulsion resistance imposed by a heavy infestation of barnacles may push a ship's fuel consumption up by as much as 40% (*The Economist* Technology Quarterly Q3 2011, Sep. 3, 2011). Solving the general fouling problem therefore has both a positive financial and environmental impact due to lowered fuel costs and reduced $CO_2$ emissions, but at the same time anti-fouling paints present a problem due to the amounts of biocidal compounds (including heavy metals) which are constantly liberated into the oceans.

Fouling is typically settled in the following sequence: Bacteria, algae, hydrozoa/bryozoa, barnacles and other animals.

Fouling is commonly fought using anti-fouling paints/coatings, which release biocidal compounds that are active on the film surface. Biocides are chemical compounds, which are toxic to microbial cells, and thereby prevent the growth of unwanted micro and macro-organisms, whereas the less frequently used biorepellents typically have a relatively low toxicity, and work by repelling or deterring the unwanted biological organisms from submerged installations or areas.

Most anti-fouling compounds are not efficient against all types, why combinations of active compounds become necessary. In traditional anti-fouling paints, the leaching of the active compounds rarely follows the same decay curve. Before the end of its service life, the coating may thus become only partially successful at preventing fouling.

Most antifouling coatings contain cuprous oxide or other copper derivatives as the active biocide that repels weed and molluscs. The cuprous oxide particles are held in suspension in various types of media, from soft ablating paints to hard epoxy resin, and reacts with oxygen in the air to produce cupric ions which repel living molluscs and most organic weed growth (*Yachting Monthly*, Feb. 4, 2016).

A commonly used anti-fouling copper derivative is copper pyrithione (CuP, see eg Almond K M et al., Ecotoxicology. 2016 March; 25(2):389-98), which may be included as a solid in anti-fouling paints. In such paints, new CuP-particles (FIG. 1, black circles) constantly become accessible in the film surface as the paint film is polished by the passage through water. However, large amounts of CuP never get a chance to exert the planned biocidal effect on the film surface because the partially abraded CuP particles are washed out of the paint film (FIG. 1, white half-circles).

Various factors such as chemical degradation and dissipation of the biocides due to washing out from the paint film therefore limits its protective life span, and necessitate re-application of new antifouling paint.

The service life of the protective coating is much shorter than the life of the ship hull, why prolonging the service life of the protective coating has a high value.

Anti-fouling paints are used on both small pleasure boats, large ships, and other submerged marine constructions. Applying a fresh layer of anti-fouling paint to such surfaces typically require the ship etc to be dry docked for cleaning and painting; a process which is laborious and—quite apart from the high material costs—also expensive in labour. On top of this come the missed earnings for the period where, for example, a container ship is out of operation.

There is therefore a general interest in developing less expensive and labour-intensive anti-fouling procedures. Even a few percent lower costs mean a lot when a large ship needs a new coating of anti-fouling paint. In addition, there is a societal interest in developing anti-fouling procedures which generate less pollution, i.e. where more of the anti-fouling biocide is used for its protective purpose, where less anti-fouling biocide is wasted, not securing any protective purpose.

The release of biocides and/or biorepellents from anti-fouling coatings can be controlled by encapsulating the active compounds, which prolongs their effective lifetime in different matrices by protecting them from leaching and unwanted degradation reactions, and by releasing them slowly. Ideally, an encapsulation method should therefore allow for a high loading of biocide/biorepellant in the encapsulation material with constant release of the active compound from the encapsulation material throughout the service lifetime of the coating. This combination of features ensures a long-lasting anti-fouling effect of the coating, makes best use of the added active compound, and thereby reduces both the cost of goods (CoG) and the negative environmental impact.

The encapsulation concept as such has previously been addressed; see e.g. Jänasä S. et al ("Slow release of a biocidal agent from polymeric microcapsules for preventing biodeterioration", *Progress in Organic Coatings*, Vol 76, Issue 1, January 2013, p 269-276) wherein biocide/biorepellents are trapped inside a water-soluble polymer (such as a polyethyleneimine (PEI)) or a polyacrylate capsule. As another similar approach can be mentioned A Kamtsikakis et al. *Bioengineering* 2017, 4(4), 81, "Encapsulation of Antifouling Organic Biocides in Poly(lactic acid) Nanoparticles" which describes i.a. the encapsulation of Irgarol 1051, Econea and Zinc pyrithione (ZPT, ZnP) in biodegradable polymer particles.

These methods achieve the goal of reducing the initial leaching of the biocide/biorepellent as the protective polymer shell must first be at least partially dissolved before the biocide/biorepellent can escape the confinement of the capsule, but this particular encapsulation concept does not address the practical requirements of a paint formulation. A biocide/biorepellent particle surrounded by a thin polymer shell is easily damaged due to the mechanical (shear) forces applied first during mixing into a paint composition, and later during the application of the paint to a surface. Furthermore, the biocide/biorepellent loading in the polymer capsules as described is not sufficiently high.

In contrast to the physically weak polymer microcapsules discussed above, an inert, mechanically robust material like silica is a better choice for encapsulating active compounds to be dispersed into an anti-fouling paint. Silica gel has the advantage that its hydrophilic/hydrophobic properties can be modified to fit a given product type. A more hydrophobic silica gel may for example be preferable as an additive to a solvent based paint composition rather than a water-borne, where a hydrophilic, water-soluble polymer particle may be more difficult to blend in.

The inventors of the present invention have previously developed a method for encapsulation of solid active compounds in silica aerogel particles, which is described in international patent application WO 2009/062975. According to the described procedure, aerogels with a content of encapsulated solid active compounds of about 50% w/w could be achieved on a small scale.

The loading limit of solid active compounds in silica aerogels is of high importance for their eventual use as anti-fouling components in paint compositions. When biocides encapsulated in silica aerogels are added to an anti-fouling paint composition, silica is necessarily added as well in the ratio determined by the loading percentage of the particular aerogel. The inventors have found that antifouling paints as a rule of thumb should not contain more than about 1.5% w/w $SiO_2$ (silica), as the paint otherwise becomes too thick/viscous and difficult to apply evenly on a surface. Therefore, increasing the amount of biocide in an anti-fouling paint cannot be attained just by adding larger amounts of loaded aerogel to the paint compositions because of the 1.5% silica limit. For example:

An aerogel with a 50% content of biocide contains 50% silica. Such an aerogel can thus at most be added to a paint in 3% w/w of the paint in order to keep below the 1.5% silica limit. This means that the final paint will contain 1.5% w/w biocide. It is not possible to add more biocide by this route without exceeding the 1.5% silica limit.

An aerogel with 80% w/w biocide contains 20% silica, so up to 7.5% w/w of this aerogel can be added to the paint. A final paint made with this aerogel will contain 80%×7.5%=6% w/w biocide, and still not more than 1.5% silica.

If an aerogel with a 90% biocide loading is used, 15% w/w of the aerogel can be added, achieving a level of 13.5% w/w biocide in the paint without exceeding the 1.5% "silica limit".

FIG. 2 shows the content of biocide in a paint composition (in w-%) as a function of the biocide loading in the aerogel when at most 1.5% silica may be added to the paint.

The method described in international patent application WO 2009/062975 was further developed and described in Wallström, E. et al. "A new concept for anti-fouling paint for Yachts" *Prog. Org. Coat.* 2011, 72, 109-114, in which it was documented that added gel particles contribute to the polishing properties of the anti-fouling paint, as the gel particles are worn down throughout the polishing process. It is also shown that zinc pyrithione is more efficient when it is encapsulated in a gel compared to a situation where it is not. However, this method was later found by the inventors (as described in "Yacht paint with minimised biocide content", Report in Danish from the Danish Ministry of Environment, Environmental Project no. 1663, 2015, referred to in the following as "the Danish 2015 report") not to be readily applicable for encapsulating higher loadings of solid active compounds than about 50-55% w/w. Aerogels described as having a content of 50% and 75% w/w Zinc Pyrithione (ZnP), respectively, were prepared by the method described in WO 2009/062975 and subsequently added to antifouling paints and applied to surfaces for testing of water absorption. The results were shown in FIG. 6.3 of the Danish 2015 report, which has been included herein as FIG. 3. The paint containing the "75% ZnP aerogel" (FIG. 3, column 3 from the left) was found to have a roughly 100% higher water absorption (app 8%) in the dry paint film than the paint containing the "50% ZnP aerogel" (FIG. 3, column 2 from the left) after 72 hours' immersion in artificial seawater. This value was deemed far too high due to the risk of eventual blistering of the coating, especially in fresh or brackish water which is known to lead to an even higher water absorption than sea water having a higher salinity. The paint containing the "75% ZnP aerogel" behaved almost as poorly as paints where ZnP had just been added as a solid to the paint composition.

It was further realized by comparing the theoretical bulk density of the product with the actual value found (see the Methods characterization section herein), that the "75% ZnP aerogel" was not homogeneous. It is therefore likely that the product referred to as a "75% ZnP aerogel" in the Danish report from 2015 in fact had a different composition, and maybe a lower actual content of entrapped ZnP. The so-called "50% ZnP aerogel" also described in the Danish 2015 report seems better substantiated, which is in line with the previous findings in WO 2009/062975 that aerogels with app 50% loadings can be produced by the method described in said reference.

This indicates that the method described in WO 2009/062975 was not able to afford a well-defined loaded aerogel with loadings above app. 50% w/w.

There thus remains a need for an improved encapsulation method which can give access to biocides and biorepellents in an encapsulated form with
- a high loading of active compounds, preferably above 60%, with high content uniformity,
- a sufficient water absorption in the resulting paint film incorporating the encapsulated biocide, and
- a constant concentration of biocide on the surface of the anti-fouling paint over the entire lifetime of the coating.

BRIEF DESCRIPTION OF DRAWINGS

FIG. 4 shows a cross section of an anti-fouling paint layer containing aerogel particles which are distributed uniformly in the paint layer. The paint layer is in this case app. 300 µm thick. Each aerogel particle may contain several discrete particles of active compound, and each aerogel particle has a dimension, depending on the fineness of grind, of approximately 10 µm.

FIG. 5 shows a close-up of the anti-fouling paint layer containing aerogel particles shown in FIG. 4. As the aerogel particles embedded in the outer surface of the paint film are exposed to the aqueous (marine) environment they start absorbing water due to their porous nature and after a while a saturated solution of the active compound is created inside the aerogel particle. FIG. 5 also shows that the aerogel particles are not readily washed out of the paint film, but remain stuck in the coating and are eventually removed by polishing/abrasion of the coating.

FIG. 9 is a table of preferred biocides and biorepellants according to the present invention.

FIG. 14 is a table summarizing the results of Example 10a and 10b

SUMMARY OF THE INVENTION

Figure 1:
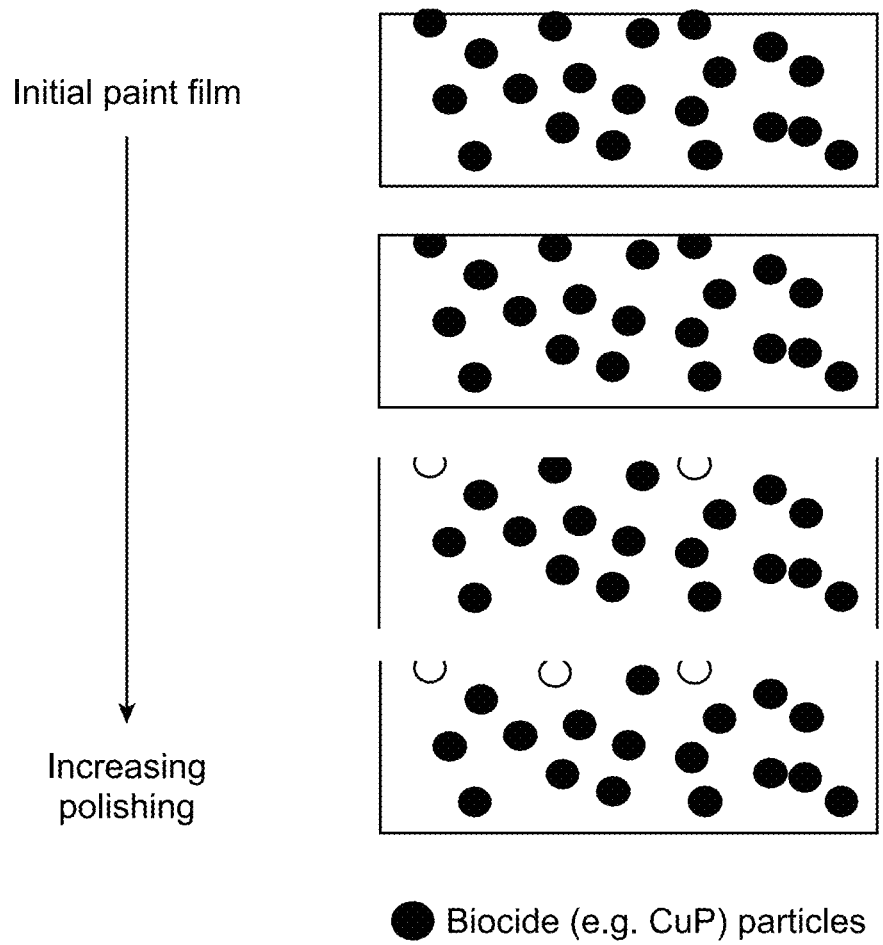
FIG. 1 shows an anti-fouling paint which comprises solid Cu pyrithione (CuP)-particles (FIG. 1, black circles) which constantly become accessible in the film surface as the paint film is polished by the passage through water. After a while the partially abraded CuP particles are washed out of the paint film (FIG. 1, white half-circles).
Figure 2:
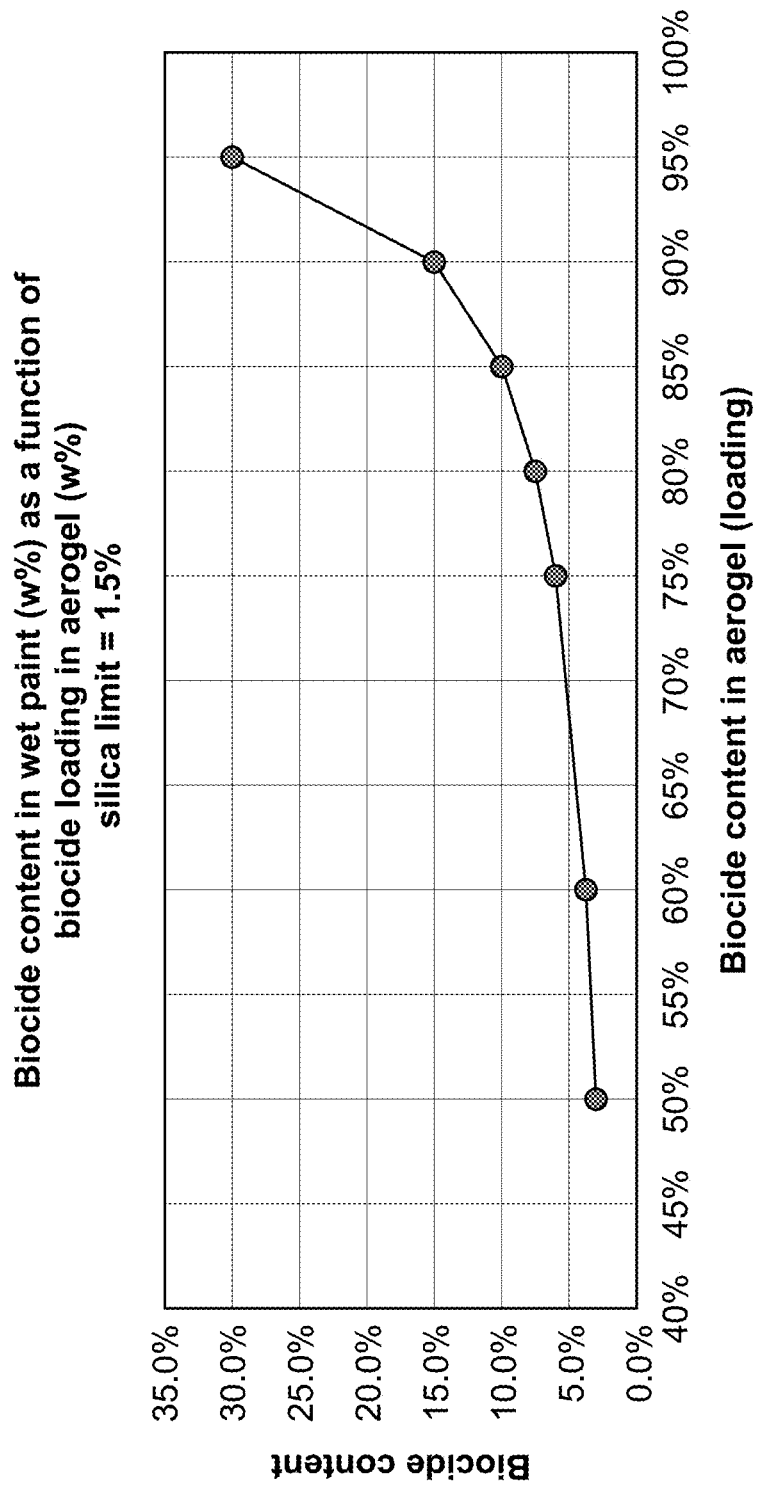
FIG. 2 shows the content of biocide in a paint composition (in w-%) which comprises biocide encapsulated in silica aerogel particles as a function of the biocide loading in the aerogel when at most 1.5% silica may be added to the paint.

The inventors of the present invention have analyzed the behaviour of anti-fouling paints, which comprise biocidal and/or biorepellant active compounds encapsulated in aerogel particles under different conditions as regards salinity and sea water temperature, and have firstly discovered that the antifouling effect to a large degree is dependent on correctly managing the water absorption of the paint coating. See FIG. 7 and FIG. 8.

The key findings have been:
Too low water absorption (<1.5 wt-%) leads to fouling and to high water absorption can lead to blistering.
The relative rosin content in the paint is not decisive for the antifouling effect.
The paint film water absorption is dependent of the gel concentration as well as the Pigment Volume Concentration (PVC).

It has thus been found important that the anti-fouling coating composition can absorb enough water to maintain a saturated solution of the active compound in the surface layer of the coating, but not so much water as to induce blistering of the coating. It is also clear that the ideal composition for one combination of salinity and water temperature is not necessarily ideal for another combination. However, a value for the water absorption of the paint coating in the range of about 1.5-6% is regarded as optimal.

The inventors have moreover found that to tailor the performance of the anti-fouling coating composition to different combinations of salinity and water temperature, the water absorption of the embedded aerogel particles themselves must be controlled. The two most important influential parameters for this purpose are 1) the loading of active compound in the encapsulating aerogel particle and 2) the porosity of said aerogel particles.

It has therefore been an objective of the present invention to afford silica aerogel particles with a high to very high loading (60-95% w/w) of a biocide and/or biorepellant, which aerogel particles—when formulated into anti-fouling paints—lead to a satisfactory water absorption of the dry paint film, such as in the range of 1.5-6% w/w.

The inventors have now developed a new manufacturing procedure for the production of novel aerogel particles comprising encapsulated biocides and/or biorepellents ("active compounds") having the required mechanical robustness for formulation into paint compositions and a high to very high loading of active compound. Upon formulation in anti-fouling paints, these novel particles lead to a satisfactory water absorption of the dry paint film. These particles have been found to be valuable as additives to anti-fouling paints.

As mentioned hereinabove the present inventors have previously worked with the encapsulation of Zinc pyrithione (ZnP) in aerogels (see e.g. PCT application WO 2009/

062975). The new method employs approximately the same ratio of tetraalkoxysilanes and alkyltrialkoxysilanes as in the original procedure described in WO 2009/062975, but employs a much lower amount of water for the gelling process. Further, less ammonia is used as catalyst, and the ammonia is added gradually in a separate ethanolic solution to the solution of silicates rather than as a concentrated aqueous solution mixed with the starting materials.

The new manufacturing procedure has first been used to improve the production of novel aerogel particles containing high loadings of encapsulated ZnP.

The novel ZnP aerogel particles initially produced were found to have a much improved homogeneity and a different porosity than the particles produced by the procedure described in WO 2009/062975. This can be measured objectively by mercury intrusion porosimetry, and described by for example the intrusion volume or the bulk density for the aerogel particles. These parameters can thus set the novel ZnP-loaded aerogel particles apart from previous aerogels having a similar nominal loading, such as the "75% ZnP aerogel" mentioned in the Danish 2015 report. Specifically, it was found by mercury intrusion porosimetry experiments that ZnP-loaded aerogels prepared with pre-condensed silicates have a significantly lower bulk density and a significantly higher intrusion volume than loaded aerogels produced from normal (monomeric) silicates. Also, the bulk density of the ZnP-loaded aerogels prepared by the newly developed procedure was found to be lower than the bulk density of gel products produced by the procedure described in WO 2009/062975, i.e. products analogous with the "75% ZnP aerogel" mentioned in the Danish 2015 report.

The inventors have since investigated the manufacturing procedure further, and found that it functions well for other biocides and reliably affords highly loaded (>60% w/w) aerogels.

The low bulk density observed for ZnP-containing aerogel particles seems however not to be a general feature for the encapsulated biocides according to the present invention (compare results of Example 10a with Example 10b). Without being bound by theory this may be readily explained since 1) the bulk density of an aerogel loaded with a biocide will be influenced by the density of the biocide itself, and 2) small deviations from ideal process conditions may lead to a slightly collapsed gel-structure, which has a higher density. Therefore, the bulk density of the loaded aerogels described herein will depend both on the relevant biocide and the entrapment conditions, and cannot be used as a descriptive feature of the novel, loaded aerogels. What does set the new loaded aerogels apart from the prior art is primarily or even exclusively the high to very high achievable loading of biocide (>60% w/w), which can be verified, e.g. by thermogravimetric analysis (TGA).

Accordingly, in a first aspect the invention therefore provides an antifouling additive comprising
  a. an inorganic, silica-containing aerogel comprising
  b. a porous gel lattice, and
  c. optionally an alcoxide comprising Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu, and
  d. one or more biocidal or biorepellant compounds entrapped in said aerogel,
wherein said silica-containing aerogel comprises at least 60% by weight of the one or more biocidal or biorepellant compounds, and wherein the entrapment of said one or more biocidal or biorepellant compounds takes place during the SOL-GEL formation of the gel, and wherein the bulk density of said aerogel has a value of at most 0.5 gr/ml when said aerogel comprises at most 75% by weight Zn pyrithione.

The particles of the first aspect can as mentioned be achieved by a newly developed manufacturing procedure, which is a further development of the method described in PCT application WO 2009/062975. Accordingly, very high amounts of biocides and/or biorepellents ("active compounds") can be encapsulated in situ in an alcogel formed by a two-step procedure using a tetraalkoxysilan (monomeric tetralkylorthosilicate or pre-condensated tetralkylorthosilicate or a combination of a pre-condensated and monomeric tetralkylorthosilicate) in combination with an alkyltrialkoxysilane+the required active compound in the sol-gel preparation, which in a final step is converted to an aerogel and dried. The resulting aerogel particles typically contain app. 60-75% w/w content of the encapsulated active compound, but can be produced with up to app. 90-95% w/w content. By varying the ratio between the starting materials, different porosities, densities and hydrophobic/hydrophilic behaviour of the final aerogel particles can be obtained. Aerogel particles can also by such variations of the method be prepared to match both solvent-based and water-borne paints.

The invention thus in a second aspect further provides a method for providing an antifouling additive of the first aspect, comprising the following steps:
  a. Prepare Solution 1: 100 parts tetraalkoxysilan (monomeric tetralkylorthosilicate or pre-condensated tetralkylorthosilicate or a mixture of pre-condensated and monomeric tetralkylorthosilicate), are mixed with 20-50 parts alkyltrialkoxysilane, 350-500 parts ethanol and 200-450 parts biocide and agitated vigorously with a mixer. Another lower alcohol can be used for the dissolution. An alcoxide comprising Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu can optionally be added at this point.
  b. Prepare Solution 2: 100 parts Ethanol, app. 50 parts water and 0.25-2 parts of a gelling catalyst are mixed.
  c. Solution 2 is added gradually to Solution 1 with vigorous stirring over 20-25 minutes. Stirring is continued at reduced speed until signs of gelling are observed after approx. 15 minutes. The resulting solution may be transferred into one or more separate containers for gelation. The gelling time is approximately 30-60 minutes.
  d. The gel is stored in suitable containers for 2-3 days after which it is transferred to the extractor(s).
  e. The wet gel is cut into smaller pieces and transferred under ethanol to a suitable pressure vessel (flow reactor, equipped with heating jacket and metal frits in both ends). There the gel is flowed with ethanol at 0.5 mL/min. Then the temperature in the heating jacket is raised to about 40° C. and the pressure raised to 110-115 bars (or app. 80 bars for biocides soluble in ethanol), at a rate of 3 bars/min. for 7-8 hours, until the recovery of ethanol is 1 ml/minute. The exact values of temperature and pressure will depend to some degree on the chosen loaded aerogel, but can easily be assessed by routine experimentation. $CO_2$ is flowed through the vessel at a rate of approximately 6 mL/min measured at 10° C. After flowing the pressure is slowly released during several hours.

In a third aspect there is provided an antifouling additive obtainable by the method according to the second aspect.

In a fourth aspect there is provided the use of an antifouling additive according to the first or third aspect, in marine paints.

In a fifth aspect there is provided an antifouling paint composition comprising the antifouling additive according to the first or third aspect of the present invention.

DETAILED DESCRIPTION

As described in the summary of invention, the inventors have now developed a new manufacturing procedure for the production of novel aerogel particles comprising encapsulated biocides and/or biorepellents ("active compounds") having the required mechanical robustness for formulation into paint compositions and a high to very high loading of active compound. Upon formulation in anti-fouling paints, these particles lead to a satisfactory water absorption of the dry paint film. These particles have been found to be valuable as additives to anti-fouling paints.

Accordingly, in a first aspect the invention provides an antifouling additive comprising
 a. an inorganic, silica-containing aerogel comprising
 b. a porous gel lattice, and
 c. optionally an alcoxide comprising Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu, and
 d. one or more biocidal or biorepellant compounds entrapped in said aerogel,
wherein said silica-containing aerogel comprises at least 60% by weight of the one or more biocidal or biorepellant compounds, and wherein the entrapment of said one or more biocidal or biorepellant compounds takes place during the SOL-GEL formation of the gel, and wherein the bulk density of said aerogel has a value of at most 0.5 gr/ml when said aerogel comprises at most 75% by weight Zn pyrithione.

The limitation involving the bulk density for ZnP-containing aerogels (". . . the bulk density of said aerogel has a value of at most 0.5 gr/ml when said aerogel comprises at most 75% by weight Zn pyrithione") has been introduced to differentiate the specific embodiment of the present invention in which the aerogel particles contain zinc pyrithione from the alleged "75% ZnP aerogel" product mentioned in the Danish 2015 report. As mentioned above, it has been found by intrusion porosimetry experiments that loaded aerogels containing app. 75% w/w ZnP prepared with pre-condensated silicates have a significantly lower bulk density and a significantly higher intrusion volume than aerogels produced from normal silicates. As can be seen in the experimental section (Example 10a), the average bulk density of an aerogel containing 75% w/w ZnP produced with normal silicates is about 0.58 g/ml (batch 1A-C) whereas the bulk density for similarly loaded aerogels produced with pre-condensated silicates (batch 2A-B) is about 0.39 g/ml, both set of values measured by mercury intrusion porosimetry. The bulk density for an aerogel matching the "75% ZnP aerogel" mentioned in the Danish 2015 report was found to be 0.56 g/ml.

Using the same manufacturing procedure, the inventors have since produced loaded aerogels with other biocides, e.g. Cu pyrithione (CuP), Econea® (i.e. 4-bromo-2-(4-chlorophenyl)-5-(trifluoromethyl)-1H-pyrrole-3-carbonitrile) and Cu thiocyanate (CuT).

As regards bulk density, the overall results for these loaded aerogels are not as clear as for the Example 10a results, which only covered one biocide (ZnP) at one specific loading (75% w/w). For similarly loaded CuP-aerogels produced by either the new or the old manufacturing process the bulk density was found to be app 0.4 gr/ml, but for Econea and Cu thiocyanate the value was closer to 0.7 mg/ml.

It thus firstly seems that biocide-loaded aerogels according to the present invention even at comparable loadings do not as a rule have a low (i.e. at most 0.5 gr/ml) bulk density (compare results of Example 10a with Example 10b). Without being bound by theory this may be explained by the variation of the density of the encapsulated biocides themselves.

Secondly, the experimental results (Example 10a+Example 10b) indicate that using pre-condensated silicates do not as a rule afford loaded aerogels with lower bulk density than using monomeric silicates. For ZnP loaded aerogels produced with monomeric/normal silicates the average bulk density is >0.5 gr/cm$^3$ whilst the ZnP loaded aerogels produced with pre-condensated silicates the average bulk density is <0.5 gr/cm$^3$. However for CuP loaded aerogels the bulk density is <0.5 gr/cm$^3$ for all samples, irrespective of the type of silicate. Finally for the two other types of biocide, Econea and Copper thiocyanate, the bulk density is >0.5 gr/cm$^3$ for all samples.

Therefore, the bulk density of the loaded aerogels described herein may vary significantly, not least as a function of actual loading, and cannot be used as a general limiting feature of the novel, loaded aerogels. What does set the new loaded aerogels apart from the prior art is primarily or even exclusively the high to very high achievable loading of biocide, which can be verified e.g. by thermogravimetric analysis (TGA).

In preferred embodiments, the antifouling additive of the first aspect comprises aerogel particles which comprise at least 65% by weight encapsulated biocides and/or biorepellents ("active compounds"), such as at least 70% by weight, at least 75% by weight, at least 80% by weight, at least 85% by weight, at least 90% by weight or about 95% by weight.

To the best of the inventors' knowledge, aerogels containing such high amounts of encapsulated materials have not previously been disclosed, except potentially from the alleged "75% ZnP aerogel" product mentioned in the Danish 2015 report, which however has a different porosity and homogeneity than the loaded aerogels of the present invention.

The highly loaded gel particles of the present invention allow for high amounts of biocides and/or biorepellents ("active compounds") to be added to anti-fouling paints, whilst keeping the concomitantly added amount of silica below the 1.5% w/w limit discussed above.

According to the inventors' newly developed manufacturing procedure, which is a further development of the method described in PCT application WO 2009/062975, very high amounts of biocides and/or biorepellents ("active compounds") can be encapsulated in situ in an alcogel formed by a two-step procedure using a tetraalkoxysilan (monomeric tetralkylorthosilicate or pre-condensated tetralkylorthosilicate or a combination of a pre-condensated and monomeric tetralkylorthosilicate) in combination with an alkyltrialkoxysilane+the required active compound in the sol-gel preparation, which in a final step is converted to an aerogel and dried.

This new method employs approximately the same ratio of tetraalkoxysilanes and alkyltrialkoxysilanes as in the original procedure described in PCT application WO 2009/062975, but employs a much lower amount of water for the gelling process. Further, less ammonia is used as catalyst, and the ammonia is added gradually in a separate ethanolic solution to the solution of silicates rather than as a concentrated aqueous solution mixed with the starting materials. These changes to the original procedure described in WO 2009/062975 have surprisingly enabled the production of loaded aerogels with very high (>60% w/w) loadings of active compounds (e.g. biocides and bioreppellants) and much higher homogeneity of the loaded gels than obtainable by the procedure described in WO 2009/062975.

The new method has been found amenable to scale-up, so far to pilot production scale in 10-ltr equipment.

The resulting aerogel particles typically contain app. 60-85% w/w content of the encapsulated active compound, but can be produced with up to app. 90-95% w/w content. By varying the ratio between the three starting materials, different porosities, densities and hydrophobic/hydrophilic behaviour of the final aerogel particles can be obtained. Aerogel particles can also by such variations of the method be prepared to match both solvent-based and water-borne paints.

Furthermore, the aerogels obtained by the method of the invention have bulk densities which are very close to the theoretical values.

The theoretical bulk density ($BD_{th}$) of a given aerogel loaded with biocide can be calculated as follows:

$$BD_{th} = (w_{AG} + w_{BC})/(vol_{AG} + vol_{BC})$$

wherein
$w_{AG}$=weight of the empty (not loaded) aerogel
$w_{BC}$=weight added biocide
$vol_{AG}$=volume aerogel
$vol_{BC}$=volume added biocide The volume of the added active compound can be calculated as the weight of the added active compound divided by its density, which can be determined by the method described in the Methods Characterization section herein, in case the value is not known. For commercial biocides and biorepellants, however, physical characteristics such as densities are typically known.

The volume of the added aerogel can likewise be calculated as the weight of the added aerogel divided by the density of the aerogel, which can also be determined by the method described in the Methods Characterization section. As a rule of thumb, the density of the empty (not loaded) aerogels produced by the methods produced herein have been found by the inventors to be app. 0.1-0.2 gr/cm³±10%.

If the density of the biocide is known, the theoretical bulk density of a loaded aerogel containing the biocide can easily be calculated as:

$$BD_{th} = 1/((1-w\%_{BC})/dens_{AG} + (w\%_{BC}/dens_{BC}))$$

wherein
w $\%_{BC}$=percent w/w added biocide,
$dens_{AG}$=density of empty aerogel (0.1-0.2 gr/cm³±10%) and
$dens_{BC}$=density of the biocide The below table shows the calculated theoretical bulk densities $BD_{th}$ for aerogels containing app 75% w/w of the above mentioned biocides as a function of three assumed density values for the empty gel (0.1-0.15-0.2 gr/cm³). The table also shows the densities of the pure biocides and the measured bulk densities $BD_{act}$ of the loaded aerogels. As can be seen, all loaded aerogels have bulk densities which differ at most ±20% from the calculated $BD_{th}$:

| | | Empty gel density ($dens_{AG}$) | | | |
|---|---|---|---|---|---|
| Density (gr/cm³): | | 0.1 | 0.15 | 0.2 | |
| W % Aerogel with biocide: | Biocide density | Calculated bulk density loaded gel ($BD_{TH}$) | | | Measured bulk density ($BD_{act}$) |
| 75% Zinc pyrithione | 1.78 | 0.34 | 0.48 | 0.60 | 0.396 |
| 75% Copper pyrithione | 1.82 | 0.34 | 0.48 | 0.60 | 0.397 |
| 75% Econea | 1.71 | 0.34 | 0.48 | 0.59 | 0.706 |
| 75% Copper thiocyanate | 2.84 | 0.36 | 0.52 | 0.66 | 0.748 |

To illustrate the effect of loading on the bulk density, the next table shows the calculated bulk densities of aerogels loaded with three different levels (60, 75 and 85% w/w) of Copper thiocyanate:

| | | Empty gel density ($dens_{AG}$) | | | |
|---|---|---|---|---|---|
| Density (gr/cm³): | | 0.1 | 0.15 | 0.2 | |
| W % Aerogel with biocide: | Biocide density | Calculated bulk density loaded gel ($BD_{TH}$) | | | Measured bulk density ($BD_{act}$) |
| 60% Copper thiocyanate | 2.84 | 0.24 | 0.35 | 0.45 | N/A |
| 75% Copper thiocyanate | 2.84 | 0.36 | 0.52 | 0.66 | 0.748 |
| 85% Copper thiocyanate | 2.84 | 0.56 | 0.77 | 0.95 | N/A |

As can be seen, the bulk density of a loaded aerogel containing a given biocide varies significantly with biocide loading, and can therefore only be used in relative terms to define the new loaded aerogels (i.e. relative to the employed biocide and the loading).

In a preferred embodiment the invention therefore provides an antifouling additive comprising inorganic, silica-containing aerogels having an actual bulk density $BD_{act}$ which has a value that differs at most ±20% from the theoretical value $BD_{th}$, such as at most ±10%, or at most ±5% which is an indication that by using the inventive manufacturing procedure of the present invention, the active compound is distributed almost completely homogeneously in the aerogel preparation during the SOL-GEL process.

The skilled person can for a given combination of aerogel and active compound easily calculate the theoretical value $BD_{th}$ and determine the actual bulk density $BD_{act}$ and can therefore without undue burden or inventive effort assess whether a concrete example of an aerogel loaded with active compound falls under the description of this embodiment.

Partially condensed silica made from a prepolymerization of tetraalkoxysilanes such as TMOS or TEOS monomers under acidic conditions can be used to prepare monolithic silica aerogels. The prepolymerized TMOS and TEOS precursors used are commercially available.

The invention thus in a second aspect further provides a method for providing the antifouling additive of the first aspect, comprising the following steps:
 a. Prepare Solution 1: 100 parts tetraalkoxysilan (monomeric tetralkylorthosilicate or pre-condensated tetralkylorthosilicate or a mixture of pre-condensated and monomeric tetralkylorthosilicate), are mixed with 20-50 parts alkyltrialkoxysilane, 350-500 parts ethanol and 200-450 parts biocide and agitated vigorously with a mixer. Another lower alcohol can be used for the dissolution. An alcoxide comprising Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu can optionally be added at this point.
 b. Prepare Solution 2: 100 parts Ethanol, app. 50 parts water and 0.25-2 parts of a gelling catalyst are mixed.
 c. Solution 2 is added gradually to Solution 1 with vigorous stirring over 20-25 minutes. Stirring is continued at reduced speed until signs of gelling are observed after approx. 15 minutes. The resulting solution may be transferred into one or more separate containers for gelation. The gelling time is approximately 30 minutes.
 d. The gel is stored in suitable containers for 2-3 days after which it is transferred to the extractor(s).
 e. The wet gel is cut into smaller pieces and transferred under ethanol to a suitable pressure vessel (flow reactor, equipped with heating jacket and metal frits in both ends). There the gel is flowed with ethanol at 0.5 mL/min. Then the temperature in the heating jacket is raised to 40° C. and the pressure raised to 110-115 bars (or app. 80 bars for biocides soluble in ethanol), at a rate of 3 bars/min. for 7-8 hours, until the recovery of ethanol is 1 ml/minute. The exact values of temperature and pressure will depend to some degree on the chosen loaded aerogel, but can easily be assessed by routine experimentation. $CO_2$ is flowed through the vessel at a rate of approximately 6 mL/min measured at 10° C. After flowing the pressure is slowly released during several hours.

The tetraalkoxysilanes that may be employed in the present invention comprise alkyl groups ranging from 1 to 4 carbon atoms such as methyl, ethyl, propyl, and butyl. The most preferred tetraalkoxysilanes are tetramethyl orthosilicate (TMOS) and tetraethyl orthosilicate (TEOS).

In preferred embodiments the tetraalkoxysilane is selected from TMOS (Tetramethyl orthosilicate), TEOS (Tetraethyl orthosilicate), tetra-n-propoxysilane and tetra-n-butoxysilane.

In another preferred embodiment the pre-hydrolysed/pre-condensated tetraalkoxysilane is selected from pre-hydrolysed tetramethylorthosilicate, (eg. Dynasylan® M), pre-hydrolysed tetraethylorthosilicate (eg. Dynasylan® A) or pre-hydrolysed tetra n-propylorthosilicate (eg. Dynasylan® P).

In a preferred embodiment the alkyltrialkoxysilane is selected from MTMS (methyltrimethoxysilane) and MTES (methyltriethoxysilane).

The gelling catalyst can be any conveniently used catalyst for aerogel formation, such as aqueous ammonia (conveniently concentrated aq. NH3 or 25% in water). Other applicable gelling catalysts include ammonium fluoride, sodium fluoride and sodium carbonate. Such alternative catalysts are preferred in cases where the biocide may react with ammonia.

The method of the second aspect thus allow for a broad range of biocide loadings (from <50% up to at least 85% w/w) but may give rise to different material characteristics such as porosity, bulk density, surface area etc., depending on the choice of starting materials. Examples of using various versions of the generic method can be found in the Experimental section, including scale-up experiments.

In a third aspect there is provided an antifouling additive obtainable by the method according to the second aspect.

In preferred embodiments the invention provides an antifouling additive according to the first or third aspect of the invention, which comprises one or more biocidal or biorepellant compounds selected from the group consisting of: pyrithione compounds, basic copper carbonate, isothiazolinone compounds, substituted triazines, carbamates, chlorinated aromatic ureas, triazoles and combinations thereof. Examples of pyrithione compound include metal pyrithione compounds such as zinc pyrithione, copper pyrithione, zirconium pyrithione, sodium pyrithione and the like. Examples of isothiazolinone compounds include, for example: 4,5-Dichloro-2-n-octyl-4-isothiazolin-3-one (DCOIT), 1,2-benzisothiazolin-3-one (BIT), n-butyl isothiazolinone (BBIT), n-octyl isothiazolinone (OIT) and mixtures thereof. Substituted triazines indude, for example, terbutryn (2-tert-butylamino-4-ethylamino-6-methylthio-1, 3,5-triazine). Carbamates include, for example iodopropynyl butylcarbamates (IPBC). Chlorinated aromatic ureas, include, for example, diuron (dichlorophenyl dimethylurea). Of the pyrithione compounds, generally, zinc pyrithione is used from the standpoint of cost and effectiveness. Depending on the intended use of the encapsulated biocidal or biorepellant compound, those skilled in the art would be able to determine which active ingredients could be used in the present invention.

As used herein, the term "biocidal or biorepellant compounds" is intended to mean an ingredient which has biocidal or biorepellant properties, including, but not limited to active ingredients that are antimicrobial, sporicidal, fungicidal and the like.

The intended use of the anti-fouling additive of the present invention is to be added to an anti-fouling paint to be applied for marine use (boats, pleasure yachts, commercial vessels, static constructions submerged in water etc).

When the prepared aerogel particles are included in an anti-fouling paint, the encapsulated active compound is distributed uniformly in the paint layer. Each aerogel particle may contain several discrete particles of active compound (FIG. 4).

In a fourth aspect there is therefore provided the use of an antifouling additive according to the first or third aspect, in marine paints.

In a fifth aspect there is provided an antifouling paint composition comprising the antifouling additive according to the first or third aspect of the present invention.

When the anti-fouling paint film is polished either by contact with moving water, or by passage through water, the aerogel particles embedded in the outer surface of the paint film are exposed to the aqueous (e.g. marine) environment, and start absorbing water due to their porous nature. This creates a local aqueous environment inside the exposed aerogel particles around the entrapped active compound particles, which slowly start dissolving. After a while a saturated solution of the active compound is created inside the aerogel particle (FIG. 5).

This then serves as a reservoir of active compound, and release to the surface of the anti-fouling coating occurs when the active compound permeates the porous structure of the aerogel particle and out onto the surface of the anti-fouling film coating. In contrast to the situation in FIG. 1, discussed in the Summary hereinabove, the aerogel particles are not readily washed out of the paint film, but remain stuck in the coating and are eventually removed by polishing/abrasion of the coating. The aerogel particles thereby contribute to the polishing effect of the anti-fouling paint.

As long as there is still undissolved active compound present inside the aerogel particles, thereby ensuring a saturated reservoir of dissolved active compound, release to the surface will take place with substantially zero order kinetics. The release profile over time is in other words substantially linear.

The concentration of the biocide/biorepellant on the wetted surface (i.e. when the surface is immersed in water) of the anti-fouling coating is thus kept practically constant during the expected service life of the coating. If more than one biocide/biorepellant is required, each active compound can be individually encapsulated and included in the anti-fouling paint in the correct ratio, thus securing that the individual active compounds do not interact with each other during storage, and that a constant ratio between the released compounds from the final coating is maintained during its expected service life.

In preferred embodiments, the present invention provides antifouling paint compositions comprising an amount of antifouling additive according to current invention, which corresponds to at least 4% w/w biocide, such as to at least 5% w/w biocide, such as to at least 6% w/w biocide, such as to at least 7% w/w biocide.

In a further embodiment of the present invention, an anti-fouling paint is provided which comprises two or more different biocides and/or biorepellants, encapsulated individually in different aerogels, which are then added to the anti-fouling paint in the required ratio.

The invention further introduces a method to control the water absorption of the anti-fouling coating, which is dependent on the structure and composition of the added aerogel. The water absorption of an anti-fouling coating containing aerogel-encapsulated biocide or biorepellant has a somewhat higher water absorption than the traditional anti-fouling paints. This is caused by the tendency of aerogels to swell when in contact with water.

It has however now been found that apart from allowing for high loadings of active compounds, by changing the ratio of the starting materials for the encapsulating aerogel (ie. the pre-condensated tetraalkoxysilane, the tetraalkoxysilane and the alkyltrialkoxysilane), the swelling of the aerogel particle can be controlled, and thus the water absorption of the coating. This is important, as the water absorption of the antifouling coating is dependent on the salinity of the water wherein the coating is submerged: fresh water and brackish water, which both have a low salinity, induce an app. 50% higher water absorption in the coating than sea water having a higher salinity. For use under conditions of low salinity, it is therefore important to choose an aerogel encapsulation with a sufficiently low water absorption and optimize the coating formulation to reduce the salinity sensitivity (see FIG. 7 and FIG. 8).

The invention further introduces a method to enhance the polishing effect of anti-fouling coatings in comparison with traditional anti-fouling compositions.

Polishing (i.e. abrasion) of the coating surface is a basic property of an antifouling paint/coating which is typically dependant on the binder system, e.g. the content of rosin and self-polishing binders, but also the content of for example cuprous oxide and/or zinc oxide plays a role in this mechanism. The inventors of the present invention have however found that coatings which contain aerogel particles benefit from a further polishing mechanism, as aerogels can swell when they are in contact with water. It has been shown that this swelling effect can introduce a nano-scale surface structure change of the surface of the coating, which has an enhancing impact on the polishing effect. Initial data suggests that this structure seems to reduce barnacle settlement, even in the absence of biorepellents or biocides.

The procedure has been found to work well for many distinctly different chemical structures, such as pyrithiones, isothiazoles and isothiazolones, triazoles, imidazoles and benzimidazoles, halogenated pyrroles, ureas, carbamates, sulfamides, and zinc and copper salts such as zinc thiocarbamate, copper thiocyanate, copper (II) hydroxide and copper(II) carbonate-copper(II) hydroxide (1:1) and metallic copper.

In one embodiment the encapsulated biocidal or biorepellant compound is selected from pyrithiones of formula:

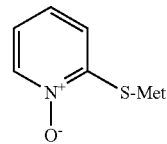

wherein Met is a metal chosen from Copper, Zinc, Zirconium, or Sodium.

In a preferred embodiment the encapsulated biocidal or biorepellant compound is selected from Zinc pyrithione, Copper pyrithione or Sodium Pyrithione.

In another embodiment the encapsulated biocidal or biorepellant compound is selected from isothiazoles of formula:

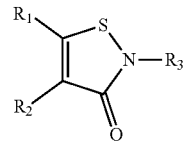

wherein $R_1$ and $R_2$ may be halogen or hydrogen, or $R_1$ and $R_2$ may be fused to form an optionally further substituted aromatic ring and $R_3 = C_3 - C_{12}$ alkyl.

In a specific embodiment the biocidal or biorepellant compound is selected from 2-butyl-benzol[d]isothiazol-3-one (BBIT), 2-octyl-2H-isothiazol-3-one (OIT) or 4,5-Dichloro-2-octylisothiazol-3(2H)-one (DCOIT, Sea-Nine).

In another embodiment the encapsulated biocidal or biorepellant compound is selected from triazoles of formula:

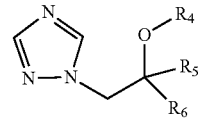

wherein $R_4$=hydrogen, $C_1$-$C_6$ alkyl, $R_5$=$C_1$-$C_6$ alkyl, $C_1$-$C_6$ alkyloxy, $R_6$=aryl, $C_1$-$C_6$ arylalkyl and wherein $R_4$ and $R_5$ may be fused to form a 5-6 membered ring containing at least one oxygen.

In a specific embodiment the biocidal or biorepellant compound is selected from 1-(4-chlorophenyl)-4,4-dimethyl-3-(1,2,4-triazol-1-yl-methyl)pentan-3-ol (Tebuconazole), 1-[[2-(2,4-dichlorophenyl)-4-propyl-1,3-dioxolan-2-yl]methyl]-1H-1,2,4-triazole (Propiconazole) or (2RS,3RS; 2RS,3SR)-2-(4-chlorophenyl)-3-cyclopropyl-1-(1H-1,2,4-triazol-1-yl)butan-2-ol (Cyproconazole).

In another embodiment the encapsulated biocidal or biorepellant compound is selected from triazines of the general formula:

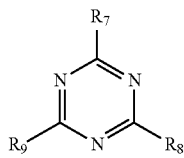

wherein $R_7$=$C_1$-$C_6$ alkylthio, $R_8$=$C_1$-$C_6$ alkylamino and $R_9$=$C_1$-$C_6$ alkylamino.

In a preferred embodiment the biocidal or biorepellant compound is 2-ethylamino-6-methylthio-4-tert-butylamino-1,3,5-triazine (Terbutryn).

In another embodiment the encapsulated biocidal or biorepellant compound is selected from imidazoles of the general formula:

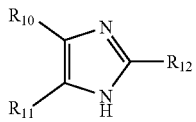

wherein $R_{10}$ and $R_{11}$ may be hydrogen, $C_1$-$C_6$ alkyl or $C_1$-$C_3$ arylalkyl, or be fused to form a benzimidazole ring, and $R_{12}$=hydrogen, heteroaryl or carbamoyl.

In a specific embodiment the biocidal or biorepellant compound is selected from 2-thiazol-4-yl-1H-benzoimidazole (Thiabendazole), (RS)-4-[1-(2,3-Dimethylphenyl)ethyl]-3H-imidazole (Medetomidine) and Methyl 1H-benzimidazol-2-ylcarbamate (Carbendazim).

In another embodiment the encapsulated biocidal or biorepellant compound is selected from halogenated pyrroles of the general formula:

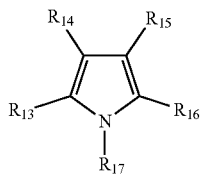

wherein $R_{13}$=Aryl, $R_{14}$=halogen, cyano, trifluoromethylsulfonyl, $R_{15}$=halogen, trifluoromethylthio, $R_{16}$=cyano, trifluoromethyl, halogen, $R_{17}$=hydrogen, $C_2$-$C_6$ alkyloxymethyl,
wherein at least one of $R_{14}$, $R_{15}$ and $R_{16}$ is halogen, In specific embodiments the biocidal or biorepellant compound is selected from 4-Bromo-2-(4-chlorophenyl)-5-(trifluoromethyl)-1H-pyrrole-3-carbonitrile (Tralopyril) and 4-bromo-2-(4-chlorophenyl)-1-ethoxymethyl-5-trifluoromethylpyrrole-3-carbonitrile (Chlorfenapyr).

In another embodiment the encapsulated biocidal or biorepellant compound is selected from carbamates, ureas or sulfamides of the general formula:

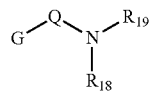

wherein Q=carbonyl (C=O) or sulfonyl (O=S=O), $R_{18}$=aryl, $C_1$-$C_8$ alkyl, hydrogen and $R_{19}$=$C_1$-$C_6$ alkyl, hydrogen, G=O—$R_{20}$ or N($R_{21}R_{22}$) wherein $R_{20}$=$C_3$-$C_6$ alkynyl, $C_1$-$C_6$ alkyl, $R_{21}$=$C_1$-$C_8$ alkyl, trihalomethylthio, hydrogen and $R_{22}$=$C_1$-$C_8$ alkyl, aryl, hydrogen.

In a further embodiment the biocidal or biorepellant compound is selected from carbamates, ureas or sulfamides of the below three general formulae, respectively:

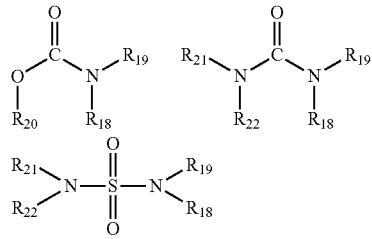

wherein $R_{18}$=aryl, $C_1$-$C_8$ alkyl, hydrogen and $R_{19}$=$C_1$-$C_6$ alkyl, hydrogen, $R_{20}$=$C_3$-$C_6$ alkynyl, $C_1$-$C_6$ alkyl, $R_{21}$=$C_1$-$C_8$ alkyl, trihalomethylthio, hydrogen and $R_{22}$=$C_1$-$C_8$ alkyl, aryl, hydrogen.

In specific embodiments the biocidal or biorepellant compound is selected from 3-(3,4-dichlorophenyl)-1,1-dimethylurea (Diuron), Dichloro-N-[(dimethylamino)-sulphonyl]-fluoro-N-(p-tolyl)-methanesulphenamide (Tolylfluanid), N-(Dichlorofluoromethylthio)-N',N'-dimethyl-N-phenylsulfamide (Dichlofluanid), 3-iodo-2-propynyl butylcarbamate (Iodocarb).

In yet another embodiment the encapsulated biocidal or biorepellant compound is selected from zinc and copper salts such as zinc thiocarbamate, copper thiocyanate, copper(II) hydroxide and copper(II) carbonate-copper(II) hydroxide (1:1), and metallic copper.

In particularly preferred embodiments, the encapsulated biocidal or biorepellant compound is selected from zinc pyrithione, copper pyrithione, copper thiocyanate, Tolylfluanid, Dichlorfluanid, DCOIT/Sea-Nine, Zineb={Zn[$S_2$CN(H)CH$_2$CH$_2$N(H)CS$_2$]}$_n$=Zinc ethylenebisthiocarbamate and Econea®=2-(p-chlorophenyl)-3-cyano-4-bromo-5-trifluoromethyl pyrrole (Tralopyril).

EXPERIMENTAL

Materials Used in the Aerogel Syntheses.

Gel forming materials are selected from metal oxides based on Si, Ti, Fe and Al such as tetramethylorthosilicate (TMOS, tetramethoxysilane) or tetraethylorthosilicate (TEOS, tetraethoxysilane). To make a more hydrophobic material methyltrimethoxysilane (MTMS) can be included. Pre-polymerised (pre-hydrolysed, precondensated) tetraalkoxysilanes are either commercially available or can be produced by hydrolysis of the relevant tetraalkoxysilane under weakly acidic conditions followed by polymerization at low temperature overnight.

Example 1. Preparing an Aerogel with App. 40% Encapsulated Active Compound (CuP) (Reference Example)

1. 6.9 g TMOS (Tetramethyl orthosilicate 98% from Aldrich), 3.2 g MTMS (methyltrimethoxysilane) and 40 g Ethanol was mixed on a magnetic stirrer in an Erlenmeyer flask for 15 minutes.
2. 3.5 g Copper pyrithione was added slowly to 1) during mixing. The solution was mixed for additionally 15 minutes.
3. 200 ml of ammonia solution (25%) was added dropwise to 2) during mixing at full speed (1500 RPM) on the magnetic stirrer. After additionally 2 minutes of mixing, the white opaque solution was transferred into a bluecap bottle. After approx. ½ hour, the gelation took place and the obtained gel was aged in methanol, for at least 24 hours at room temperature, before drying.
4. The wet gel from 3) was cut into smaller pieces and transferred under ethanol to a ½ L pressure vessel (½ L flow reactor, equipped with heating jacket and metal frits in both ends). There the gel was flowed with ½ L of ethanol at 0.5 mL/min. Then the temperature in the heating jacket was raised to 40° C. and the pressure raised to 110 bars, at a rate of 3 bars/min. For 8 hours at 40° C. and 110 bars, 2½ kg of $CO_2$ was flowed through the vessel at a rate of approximately 6 mL/min measured at 10° C. After flowing the pressure was slowly released during several hours. The weight of the supercritical dried aerogel was approx. 8.5 g.

1a. Preparing an Aerogel with App. 75% Encapsulated Biocide (ZnP)

1. Solution 1: 0.64 kg TMOS (Tetramethyl orthosilicate 98% from Aldrich), 0.32 kg MTMS (methyltrimethoxysilane), 3.2 kg Ethanol and 1.44 kg Zinc pyrrithione was mixed in a 10-ltr vessel and agitated vigorously with a paddle mixer.
2. Solution 2: 0.64 kg Ethanol, 0.32 kg Water and 10 ml of ammonia solution (concentrated) is mixed.
3. Solution 2 is added to solution 1 at identical mixing conditions as in (1) for 20-25 minutes at 125 rpm. Mixing speed is reduced until signs of gelling takes approx. 15 minutes (100 rpm). The gelling time is 30 minutes.
4. The gel is stored in plastic containers for 4-5 days after which it is transferred to the extractor(s).
5. The wet gel from 3) was cut into smaller pieces and transferred under ethanol to a 5 or 10 L pressure vessel (flow reactor, equipped with heating jacket and metal frits in both ends). There the gel was flowed with ½ L of ethanol at 0.5 mL/min. Then the temperature in the heating jacket was raised to 40° C. and the pressure raised to 110-115 bars, at a rate of 3 bars/min. For 7-8 hours at 40° C. and 110 bars, until the recovery of ethanol is 1 ml/minute. CO2 was flowed through the vessel at a rate of approximately 6 mL/min measured at 10° C. After flowing the pressure was slowly released during several hours. The weight of the supercritical dried aerogel was approximately 1.9 kg.

Example 2. Preparing an Aerogel with App. 40% Encapsulated CuP from Pre-Condensated TMOS (Reference Example)

1. 10.5 g pre-condensated TMOS and 5.2 g MTMS was stirred on a magnetic stirrer in an Erlenmeyer flask for 15 minutes.
2. 4.0 g Copper pyrithione was added slowly to 1) during mixing. The solution was mixed for additionally 15 minutes.
3. 300 ml of ammonia solution (25%) was added dropwise to 2) during mixing at full speed (1500 RPM) on the magnetic stirrer. After additionally 2 minutes of mixing, the white opaque solution was transferred into a bluecap bottle. After approx. 45 minutes, the gelation took place and the obtained gel was aged in methanol, for 24 hours at room temperature, before drying.
4. The wet gel from 3) was cut into smaller pieces and transferred under ethanol to a ½ L pressure vessel (½ L flow reactor, equipped with heating jacket and metal frits in both ends). There the gel was flowed with ½ L of ethanol at 0.5 mL/min. Then the temperature in the heating jacket was raised to 40° C. and the pressure raised to 110 bars, at a rate of 3 bars/min. For 8 hours at 40° C. and 110 bars, 2½ kg of CO2 was flowed through the vessel at a rate of approximately 6 mL/min measured at 10° C. After flowing the pressure was slowly released during several hours. The weight of the supercritical dried aerogel was approx. 11 g.

Example 2a. Preparing an Aerogel with App 80% Encapsulated Biocide (CuP)

1. Solution 1: 0.64 kg TMOS (Tetramethyl orthosilicate 98% from Aldrich), 0.32 kg MTMS (methyltrimethoxysilane), 3.2 kg Ethanol and 1.77 kg Copper pyrithione was mixed in a 10-ltr vessel and agitated vigorously with a paddle mixer.
2. Solution 2: 0.64 kg Ethanol, 0.32 kg Water and 10 ml of ammonia solution (concentrated) is mixed.
3. Solution 2 is added to solution 1 at identical mixing conditions as in (1) for 20-25 minutes at 125 rpm. Mixing speed is reduced until signs of gelling takes approx. 15 minutes (100 rpm). The gelling time is 30 minutes.
4. The gel is stored in plastic containers for 4-5 days after which it is transferred to the extractor(s).
   The wet gel from 3) was cut into smaller pieces and transferred under ethanol to a 5 or 10 L pressure vessel (flow reactor, equipped with heating jacket and metal frits in both ends). There the gel was flowed with ½ L of ethanol at 0.5 mL/min. Then the temperature in the heating jacket was raised to 40° C. and the pressure raised to 110-115 bars, at a rate of 3 bars/min. For 7-8 hours at 40° C. and 110 bars, until the recovery of ethanol is 1 ml/minute. CO2 was flowed through the vessel at a rate of approximately 6 mL/min measured at 10° C. After flowing the pressure was slowly released during several hours. The weight of the supercritical dried aerogel was approximately 2.2 kg.

The aim of this experiment was to encapsulate 80 w/w % CuP. Based on the inventors' experience that normally app. 55% by weight of the loaded aerogel originates from the employed monomeric/normal silicates as starting materials, the 2.2 kg contains app. 55% of 960 gr=480 gr silicates and thus app. 76% CuP.

Example 2b. Preparing an Aerogel with App. 75% Encapsulated ZnP from Pre-Condensated TMOS 1. 17.5 g pre-condensated TMOS (Dynasylan M 39%) 3.2 g MTMS and 60 g Ethanol (minimum) was stirred on a magnetic stirrer in an Erlenmeyer flask for 15 minutes.
2. 30.0 g Zinc pyrithione was added slowly to 1) during mixing. The solution was mixed for additionally 15 minutes.
3. 2 g of ammonia solution (25%) was added dropwise to 2) during mixing at full speed (1500 RPM) on the magnetic stirrer. After additionally 2 minutes of mixing, the white opaque solution was transferred into a bluecap bottle. After approx. 30 minutes, the gelation took place and the obtained gel was aged in methanol, for 24 hours at room temperature, before drying. The amount of ammonia solution can be reduced to 1 g if the gel time should be prolonged.
4. The wet gel from 3) was cut into smaller pieces and transferred under ethanol to a ½ L pressure vessel (½ L flow reactor, equipped with heating jacket and metal frits in both ends). There the gel was flowed with ½ L of ethanol at 0.5 mL/min. Then the temperature in the heating jacket was raised to 40° C. and the pressure raised to 110 bars, at a rate of 3 bars/min. For 8 hours at 40° C. and 110 bars, 2½ kg of $CO_2$ was flowed through the vessel at a rate of approximately 6 mL/min measured at 10° C. After flowing the pressure was slowly released during several hours. The weight of the supercritical dried aerogel was approximately 40 g.

Example 3. Preparing an Aerogel with App. 75% Encapsulated Biorepellent (ZnP)

1. 6.7 g TMOS (Tetramethyl orthosilicate 98% from Aldrich), 3.3 g MTMS and 40 g Ethanol was mixed on a magnetic stirrer in an Erlenmeyer flask for 15 minutes.
2. 20 g Zinc pyrithione was added slowly to 1) during mixing. The solution was mixed for additionally 15 minutes.
3. 200 ml of ammonia solution (25%) was added dropwise to 2) during mixing at full speed (1500 RPM) on the magnetic stirrer. After additionally 2 minutes of mixing, the white opaque solution was transferred into a bluecap bottle. After approx. ½ hour, the gelation took place and the obtained gel was aged in methanol, for at least 24 hours at room temperature, before drying.
4. The wet gel from 3) was cut into smaller pieces and transferred under ethanol to a ½ L pressure vessel (½ L flow reactor, equipped with heating jacket and metal frits in both ends). There the gel was flowed with ½ L of ethanol at 0.5 mL/min. Then the temperature in the heating jacket was raised to 40° C. and the pressure raised to 110 bars, at a rate of 3 bars/min. For 8 hours at 40° C. and 110 bars, 2½ kg of $CO_2$ was flowed through the vessel at a rate of approximately 6 mL/min measured at 10° C. After flowing the pressure was slowly released during several hours. The weight of the supercritical dried aerogel was approx. 25-27 g.

Example 4. Preparing an Aerogel with App. 80% Encapsulated ZnP from Pre-Condensated TMOS 1. 10.5 g pre-condensated TMOS and 5.2 g MTMS was stirred on a magnetic stirrer in a Erlenmeyer flask for 15 minutes.
2. 30.0 g Zinc pyrithione was added slowly to 1) during mixing. The solution was mixed for additionally 15 minutes.
3. 300 ml of ammonia solution (25%) was added dropwise to 2) during mixing at full speed (1500 RPM) on the magnetic stirrer. After additionally 2 minutes of mixing, the white opaque solution was transferred into a bluecap bottle. After approx. 45 minutes, the gelation took place and the obtained gel was aged in methanol, for 24 hours at room temperature, before drying.
4. The wet gel from 3) was cut into smaller pieces and transferred under ethanol to a ½ L pressure vessel (½ L flow reactor, equipped with heating jacket and metal frits in both ends). There the gel was flowed with ½ L of ethanol at 0.5 mL/min. Then the temperature in the heating jacket was raised to 40° C. and the pressure raised to 110 bars, at a rate of 3 bars/min. For 8 hours at 40° C. and 110 bars, 2½ kg of $CO_2$ was flowed through the vessel at a rate of approximately 6 mL/min measured at 10° C. After flowing the pressure was slowly released during several hours. The weight of the supercritical dried aerogel was 37.5 g.

The aim of this experiment was to encapsulate 80 w/w % ZnP. Based on the inventors' experience that normally 45-50% by weight of the loaded aerogel originates from the employed precondensated materials as starting materials, the 37.5 gr contains app. 50% of 15.7 gr=7.35 gr silicates and thus app. 80% Zinc pyrithione, which is in good agreement with TGA measurements (FIG. 14).

Example 5. Preparing an Aerogel with App. 80% Encapsulated CuP from Pre-Condensated TMOS 1. A mixture of 17.5 g pre-condensated TMOS (Dynasylan M 39%), 3.2 g MTMS and 60 g Ethanol (minimum) was stirred on a magnetic stirrer in an Erlenmeyer flask for 15 minutes.
2. 40.0 g Copper pyrithione was added slowly to 1) during mixing. The solution was mixed for additionally 15 minutes.
3. 2 g of ammonia solution (25%) was added dropwise to 2) during mixing at full speed (1500 RPM) on the magnetic stirrer. After additionally 2 minutes of mixing, the white opaque solution was transferred into a bluecap bottle. After approx. 30 minutes, the gelation took place and the obtained gel was aged in methanol (or ethanol), for 24 hours at room temperature, before drying. The amount of ammonia solution can be reduced to 1 g if the gel time should be prolonged.

The wet gel from 3) was cut into smaller pieces and transferred under ethanol to a ½ L pressure vessel (½ L flow reactor, equipped with heating jacket and metal frits in both ends). There the gel was flowed with ½ L of ethanol at 0.5 mL/min. Then the temperature in the heating jacket was raised to 40° C. and the pressure raised to 110 bars, at a rate of 3 bars/min. For 8 hours at 40° C. and 110 bars, 2½ kg of $CO_2$ was flowed through the vessel at a rate of approximately 6 mL/min measured at 10° C. After flowing the pressure was slowly released during several hours. The weight of the supercritical dried aerogel was approximately 55 g.

The aim of this experiment was to encapsulate 80 w/w % CuP. Based on the inventors' experience that normally 45-50% by weight of the loaded aerogel originates from the employed precondensated materials as starting materials, the 55 gr contains app. 50% of 20.7 gr=10.35 gr silicates and thus app. 81% Copper pyrithione, which is in good agreement with TGA measurements (FIG. 14).

Example 6. Preparing an Aerogel with Encapsulated Biocide from Pre-Condensated TMOS/TEOS 1. A mixture of 10.5 g pre-condensated TMOS or TEOS and 5.2 g MTMS is stirred on a magnetic stirrer in an Erlenmeyer flask for 15 minutes.
2. 10 g Diuron was added slowly to 1) during mixing. The solution was mixed for additionally 15 minutes.
3. 2 ml of ammonia solution (25%) was added dropwise to 2) during mixing at full speed (1500 RPM) on the magnetic stirrer. After additionally 2 minutes of mixing, the white opaque solution was transferred to a bluecap bottle. After approx. ½ hour, the gelation took place and the obtained gel was aged in methanol for 24 hours at room temperature, before drying.
4. The wet gel from 3) was cut into smaller pieces and transferred under ethanol to a ½ L pressure vessel (½ L flow reactor, equipped with heating jacket and metal frits in both ends). There the gel was flowed with ½ L of ethanol at 0.5 mL/min. Then the temperature in the heating jacket was raised to 40° C. and the pressure raised to 110 bars, at a rate of 3 bars/min. For 8 hours at 40° C. and 110 bars, 2½ kg of $CO_2$ was flowed through the vessel at a rate of approximately 6 mL/min measured at 10° C. After flowing the pressure was slowly released during several hours. The weight of the supercritical dried aerogel was app. 18 g.

Example 7a. Preparing an Aerogel with App. 75% Encapsulated Econea from TMOS 4. A mixture of 14 g TMOS, 7 g MTMS and 60 g Ethanol (minimum) (a higher alcohol can be used) was stirred on a magnetic stirrer in an Erlenmeyer flask for 15 minutes.
5. 36.0 g Econea was added slowly to 1) during mixing. The solution was mixed for additionally 15 minutes.
6. 1.9 g of ammonia solution (25%) and 2 g of water, was added dropwise to 2) during mixing at full speed (1500 RPM) on the magnetic stirrer. After additionally 2 minutes of mixing, the white opaque solution was transferred into a bluecap bottle. After approx. 180 minutes, the gelation took place and the obtained gel was aged in ethanol, for 48 hours at room temperature, before drying. The amount of ammonia solution can be reduced to 1 g to prolong the gelling time.
7. The wet gel from 3) was cut into smaller pieces and transferred under ethanol (or a higher alcohol) to a ½ L pressure vessel (½ L flow reactor, equipped with heating jacket and metal frits in both ends). There the gel was flowed with ½ L of ethanol at 0.5 mL/min. Then the temperature in the heating jacket was raised to 40° C. and the pressure raised to 110 bars, at a rate of 3 bars/min. For 4 hours at 40° C. and 110 bars, 2½ kg of $CO_2$ was flowed through the vessel at a rate of approximately 6 mL/min measured at 10° C. After flowing the pressure was slowly released during several hours. The weight of the supercritical dried aerogel was approximately 28 g.

Example 7b. Preparing an Aerogel with App. 75% Encapsulated Econea from Precondensated TMOS 1. A mixture of 17.5 g precondensated TMOS, 3.2 g MTMS and 60 g Ethanol (minimum) (a higher alcohol can be used) was stirred on a magnetic stirrer in an Erlenmeyer flask for 15 minutes.
2. 30.0 g Econea was added slowly to 1) during mixing. The solution was mixed for additionally 15 minutes.
3. 2 g of ammonia solution (25%), was added dropwise to 2) during mixing at full speed (1500 RPM) on the magnetic stirrer. After additionally 2 minutes of mixing, the white opaque solution was transferred into a bluecap bottle. After the gelation had taken place the obtained gel was aged in ethanol, for 48 hours at room temperature, before drying. The amount of ammonia can be reduced to 1 g to prolong the gel time.
4. The wet gel from 3) was cut into smaller pieces and transferred under ethanol (or a higher alcohol) to a ½ L pressure vessel (½ L flow reactor, equipped with heating jacket and metal frits in both ends). There the gel was flowed with ½ L of ethanol at 0.5 mL/min. Then the temperature in the heating jacket was raised to 40° C. and the pressure raised to 90 bars, at a rate of 3 bars/min. For 4 hours at 35° C. and 90 bars, 2½ kg of $CO_2$ was flowed through the vessel at a rate of approximately 6 mL/min measured at 10° C. After flowing the pressure was slowly released during several hours. The weight of the supercritical dried aerogel was approximately 33 g.

The aim of this experiment was was to encapsulate 75 w/w % Econea. Based on the inventors' experience that normally 45-50% by weight of the loaded aerogel originates from the employed precondensated materials as starting materials, the 33 gr contains app. 50% of 20.7 gr=10.35 gr silicates and thus app. 68% Econea, which is in good agreement with TGA measurements (FIG. 14). The lower than expected content of Econea is believed to be caused by extraction from the loaded gel by ethanol during the drying procedure.

Example 7c. Preparing an Aerogel with Encapsulated Copper Thiocyanate from Pre-Condensated TMOS/TEOS 5. A mixture of 14 g pre-condensated TMOS (or pre-condensated TEOS) and 7 g MTMS was stirred on a magnetic stirrer in a Erlenmeyer flask for 15 minutes.
6. 36 g Copper thiocyanate was added slowly to 1) during mixing. The solution was mixed for additionally 15 minutes.
7. 1 ml of ammonia solution (25%) and 2 g of water, was added dropwise to 2) during mixing at full speed (1500 RPM) on the magnetic stirrer. After additionally 2 minutes of mixing, the white opaque solution was transferred to a bluecap bottle. After approx. ½ hour, the gelation took place and the obtained gel was aged in ethanol for 48 hours at room temperature, before drying.
8. The wet gel from 3) was cut into smaller pieces and transferred under ethanol to a ½ L pressure vessel (½ L flow reactor, equipped with heating jacket and metal frits in both ends). There the gel was flowed with ½ L of ethanol at 0.5 mL/min. Then the temperature in the heating jacket was raised to 40° C. and the pressure raised to 110 bars, at a rate of 3 bars/min. For approx. 4 hours at 40° C. and 110 bars, 2½ kg of CO2 was flowed through the vessel at a rate of approximately 6 mL/min measured at 10° C. After flowing the pressure was slowly released during several hours. The weight of the supercritical dried aerogel was approximately 46 g.

Figure 13:
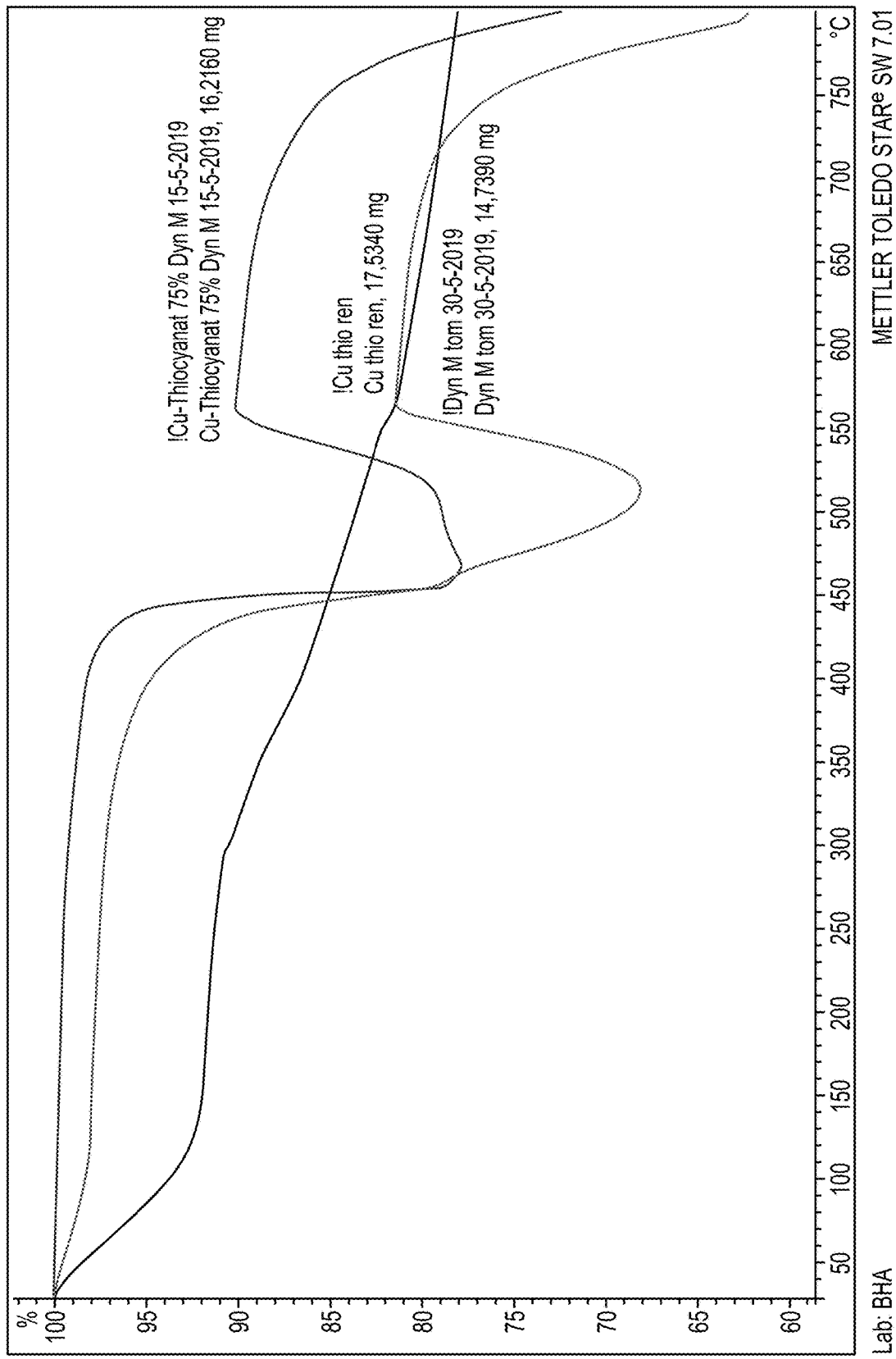

The aim of this experiment was to encapsulate 75 w/w % of Copper thiocyanate. Based on the inventors' experience that normally 45-50% by weight of the loaded aerogel originates from the employed precondensated materials as starting materials, the 46 gr contains 45-50% of 21 gr=app. 10 gr silicates and thus app. 78% Copper thiocyanate. This has not been possible to verify by TGA due to an abnormal TGA run (see FIG. 13 and FIG. 14).

Example 7d. Preparing an Aerogel with Encapsulated Zineb from Pre-Condensated TMOS/TEOS 1. 17.5 g pre-condensated TMOS (Dynasylan M 39%), 3.2 g MTMS and 60 g Ethanol (minimum) was stirred on a magnetic stirrer in an Erlenmeyer flask for 15 minutes.
2. 13 g Zineb (Zinc ethylenebisthiocarbamate) was added slowly to 1) during mixing. The solution was mixed for additionally 15 minutes.
3. 2 ml of ammonia solution (25%) was added dropwise to 2) during mixing at full speed (1500 RPM) on the magnetic stirrer. After additionally 2 minutes of mixing, the white opaque solution was transferred to a bluecap bottle. After the gelation took place the obtained gel was aged in ethanol for 48 hours at room temperature, before drying.
4. The wet gel from 3) was cut into smaller pieces and transferred under ethanol to a ½ L pressure vessel (½ L flow reactor, equipped with heating jacket and metal frits in both ends). There the gel was flowed with ½ L of ethanol at 0.5 mL/min. Then the temperature in the heating jacket was raised to 40° C. and the pressure raised to 90-110 bars, at a rate of 3 bars/min. For 4 hours at 40° C. and 110 bars, 2½ kg of CO2 was flowed through the vessel at a rate of approximately 6 mL/min measured at 10° C. After flowing the pressure was slowly released during several hours. The weight of the supercritical dried aerogel was app. 25 g.

The aim of this experiment was to encapsulate 60 w/w % of Zinc ethylenebisthiocarbamate (Zineb). Based on the inventors' experience that normally 45-50% by weight of the loaded aerogel originates from the employed precondensated materials as starting materials, the 25 gr contains 45-50% of 20.7 gr=app. 10 gr silicates and thus app. 60% Zineb.

Example 8. Measured Gel Properties

Before measuring any gel data the material has been grinded down to a medium particle size of approx. 10 µm.
Below the results for a few examples are given. It should be noticed that as expected the pore volume is lower for aerogels with encapsulated active compound than for the "unloaded" gel, but there is no significant difference in pore volume between the gels with encapsulated active compound from example 1 and 2. There is however a difference in oil number, where the oil number decreases when the active compound is included, which probably will have an influence on the interaction between the binder system and the gel. It should be expected that the amount of active compound as well as the type will have an influence on the result. The oil absorption test also reveals that the encapsulation made with pre-condensated alcoxide leads to an aerogel with different physical properties than if made with monomeric alcoxide: gels made with pre-condensated alcoxide require approximately 20% less oil for saturation

| Gel number | Pore volume $cm^3/g$ | Oil number | Gr oil/$cm^3$ for saturation |
|---|---|---|---|
| Empty gel, according to Ex.1 | 4.75 | 434 | 0.91 |
| Encapsulated CuP according to Ex.1 | 2.75 | 247 | 0.90 |
| Empty gel, according to Ex.2 | 4.64 | 332 | 0.72 |
| Encapsulated CuP according to Ex.2 | 2.57 | 187 | 0.73 |

Example 9. Water Absorption for Two Identical Paints, Except for Choice of Gel The first paint (A) includes the encapsulated gel from example 1. The second paint (B) includes the gel from example 2. The paints were dispersed until the particle size measured on a Hegman Bar was beneath 10 µm. The paints were allowed to settle for 7 days before application on the test surface.

The prototype paints produced have been applied on Aminosilane treated preparation glass, where the test area is kept constant, with a dry paint film of approximate 100 µm thickness. Each glass plate is weighed before application of paint and after a minimum of 2 days of drying at 23° C. and 50% RH. An artificial seawater solution was used for the experiments. The artificial seawater mix gives a salinity of 31-35 ppt, and a pH between 7.8-8.2. The test is typically started in the beginning of a week and the weight is registered until equilibrium or a clear tendency can be seen. This test was made in duplicate. Furthermore, a single preparation glass of each type was also exposed to demineralised water. All exposures were made at 23° C. The results show that the encapsulated active compound from example 2 gives a significant lower water absorption in the final dry paint film, see the table below. It can also be seen that the water quality has a clear influence on the result.

| Paint | Weight increase after 96 hours, seawater (duplicate) | Weight increase after 96 hours, demineralised water (single test) |
|---|---|---|
| A (gel ex.1) | 3.5% | 8% |
| B (gel ex.2) | 1.6% | 5% |

Figure 3:
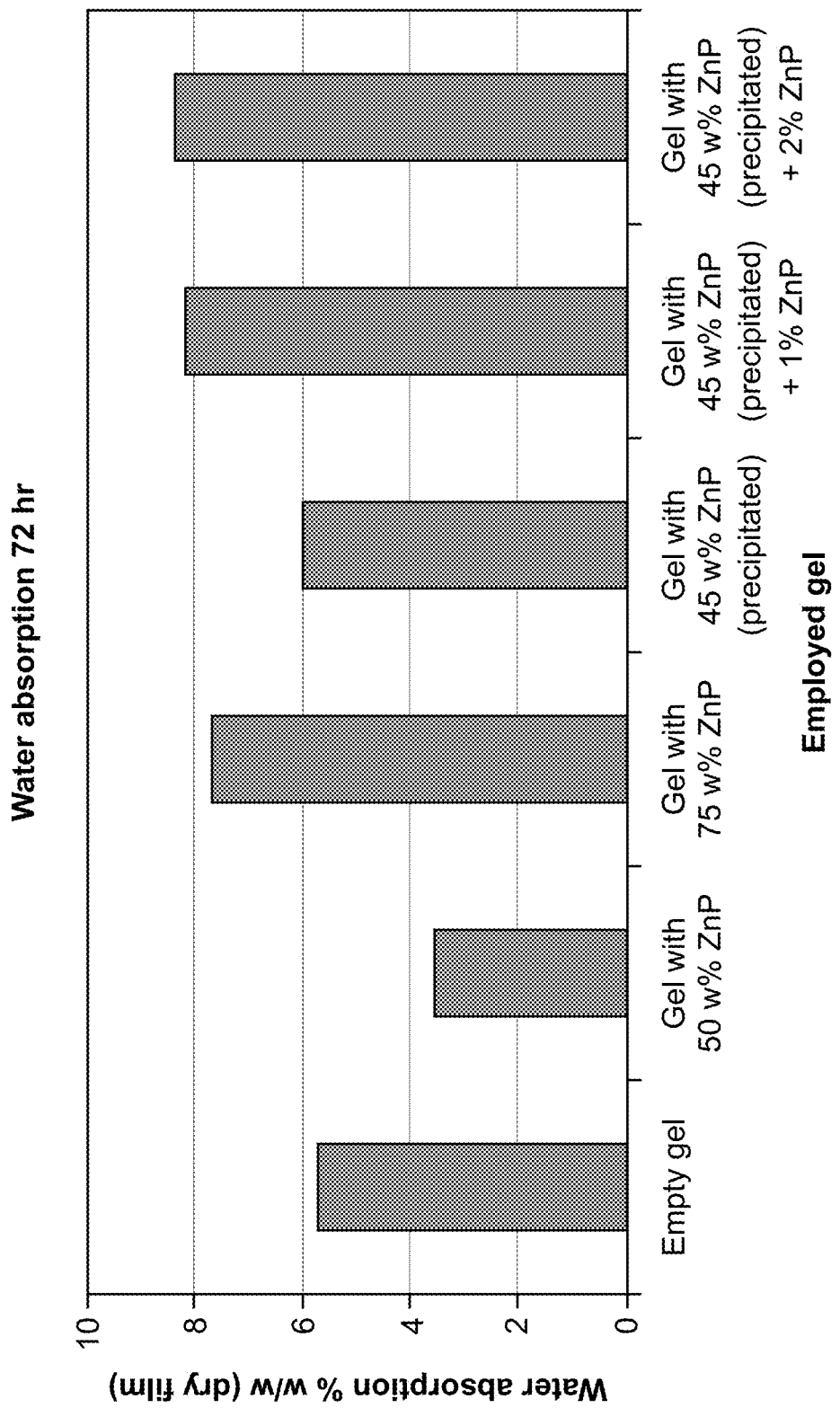
FIG. 3 is an adapted English version of FIG. 6.3 from "Yacht paint with minimised biocide content", Report in Danish from the Danish Ministry of Environment, Environmental Project no. 1663, 2015, referred to herein as "the Danish 2015 report". The figure shows the water absorption after 72 hours immersion in artificial sea water of anti-fouling paints containing aerogels described in the report as having a content of 50% and 75% w/w Zinc Pyrithione (ZnP), respectively. The figure shows that the 75% gel ($3^{rd}$ column from left) leads to an app 8% water absorption, whereas the 50% gel ($2^{nd}$ column from left) leads to a <4% water absorption.
Figure 6:
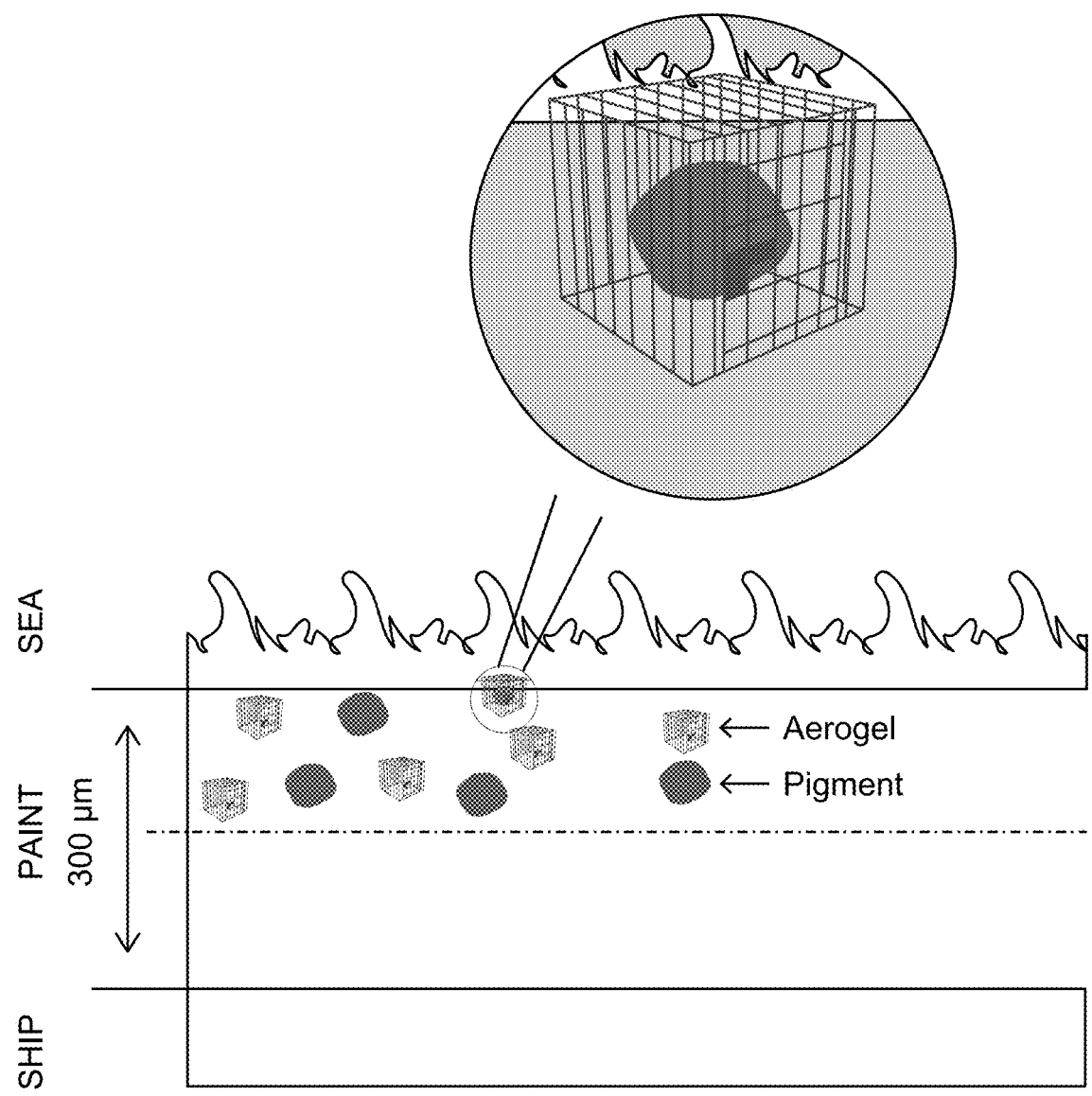
FIG. 6 shows another close-up of an anti-fouling paint layer containing pigment particles and cage-like aerogel particles with entrapped biocide. The cage serves to illustrate the function of the aerogel particle: to retain the biocide material in the paint film. The figure also illustrates the thickness of a paint layer (300 µm); for comparison the aerogel particles have a dimension, depending on the fineness of grind, of approximately 10 µm.

These results can be compared with the results from 2015 shown in the Danish 2015 report discussed hereinabove, see also FIG. 3. It was concluded in the Danish 2015 report that the "75% ZnP aerogel" gave rise to an unacceptably high water absorption in the dry anti-fouling paint film (around 8%) after 72 hours immersion in artificial sea water.

In the present test two anti-fouling paints, identical except for the added aerogel (i.e. gels from Experiment 1 and 2), have been tested for even longer (96 hours), and it was concluded that the water absorption in the dry paint was significantly lower in paint B which contained the aerogel produced in example 2, ie with pre-condensated silicates, than in paint A which contained the aerogel produced in example 1, i.e. with normal silicates.

These results also shows that there is a difference in the obtained product (the loaded aerogel) which can only be attributed to the process of its manufacture.

Example 10. Mercury Poromesitry Measurements

Background:

In mercury intrusion porosimetry, a dry sample of loaded aerogel is placed into a container, which is then evacuated to remove contaminant gases and vapors (usually water). While the container is still evacuated, mercury is allowed to fill the container. This creates a system that consists of a solid, a non-wetting liquid (mercury), and mercury vapor. In the next step pressure is increased toward ambient. This causes mercury to enter the larger openings in the aerogel sample, and the amount that does so is reflected in a volume change. The sample container is then placed in a pressure vessel and attached to a pressurization system that allows the pressure on the system to be increased up to approximately 60,000 psi (414 MPa); a typical maximum value for commercial instruments. This will force mercury into pores as small as approximately 0.003 μm in diameter. Regardless of the pore geometry and the model employed to quantify it, the volume of mercury forced into the interconnected pores of the aerogel sample increases as pressure increases. Mercury intrusion is not well-suited for analyzing the pore structure of empty aerogels, as their solid frame may collapse from the high compressive force.

Mercury intrusion porosimetry gives information about many aspects of the aerogel pore structure, notably the porosity (%), which is defined as the volume of the void (empty) space of the sample divided by the total volume of the sample. Also the intrusion volume (ml/g), which is a measure of the the interconnected porous part of the sample.

Example 10a. Measurements of ZnP-Containing Aerogels

In the present experiment, 5 different aerogel samples (1A, 1B, 1C, 2A and 2B), all containing 75% ZnP, were tested by mercury intrusion porosimetry for various pore-related parameters. Samples 1A, 1B and 1C were prepared with normal silicates under different process conditions, and samples 2A and 2B with pre-condensated TMOS.

It was found that both the bulk density and the intrusion volume was highly descriptive when defining the differences between aerogels produced using either normal tetraalkoxysilanes or pre-condensated silicates, see FIG. 14.

From the performed experiments in Example 10a it can be concluded that ZnP-containing aerogels prepared with pre-condensated TMOS have a significantly lower bulk density and a significantly higher intrusion volume than similar aerogels produced from normal silicates. On the other hand, the porosity and oil number for the two types of gel do not display a similar trend.

Example 10b. Measurements of Aerogels Containing Other Biocides

In Example 10b, 7 different aerogel samples (3A, 3B, 3C, 3D, 4A, 4B and 5), all planned to contain app. 75% w/w biocide, were tested by mercury intrusion porosimetry for various pore-related parameters. Batch 3A and 4B were prepared with normal silicates under different process conditions, samples 3B, 3C, 4A and 5 were prepared with pre-condensated TMOS and sample 3D with pre-condensated TEOS. The tested biocides were Cu pyrithione, Econea® (Tralopyril CAS [122454-29-9], 4-bromo-2-(4-chlorophenyl)-5-(trifluoromethyl)-1H-pyrrole-3-carbonitrile) and Cu thiocyanate (CuT).

In contrast to the results of Example 10a hereinabove, the results of Example 10b (see FIG. 14 which also contains the results from Example 10a) do not suggest that aerogels prepared with pre-condensated silicates have a significantly lower bulk density and a significantly higher intrusion volume than aerogels produced from normal silicates when prepared with the biocides mentioned above (Cu pyrithione, Econea® and Cu thiocyanate).

For all samples the content of encapsulated biocide was evaluated by thermogravimetric (TGA) measurements. For ZnP and CuP there was a good agreement between the amount biocide planned to be entrapped in the aerogel and the amount actually present in the aerogel when measured by TGA (77% and 76% respectively vs. 75% planned for). For Econea a gel with a higher than expected bulk density (app. 0.70 gr/ml) and lower than expected biocide content (app. 64% w/w) was achieved. Without being bound by theory, the inventors believe this is due to the solubility of Econea in ethanol. During the supercritical drying of the loaded gel, the gel is flowed with ethanol under a high pressure which is believed to extract some of the Econea, simultaneously causing the gel structure to partially collapse which leads to an increased bulk density and lower than expected content of Econea, as observed. This problem has subsequently been found to be remediable by lowering the pressure during the ethanol flowing procedure to about 80 bar. For Copper thiocyanate, experiment 7c afforded a loaded aerogel with the expected biocide content (app. 78% w/w), but the thermogravimetric analysis of the neat biocide and the loaded aerogel (see FIG. 13) suggests that a chemical reaction, possibly with oxygen, takes place during the heating of the sample which makes it impossible to calculate the weight loss. Thus the content of app. 75% w/w could not be verified by TGA. It may be possible to re-run the TGA analysis under an inert atmosphere.

Example 11. Anti-Fouling Paint Example Containing an Aerogel with Encapsulated Biocide Background:

A gel is a porous structure and when the material is grinded it is important to make sure that the gel is wetted by the binder system. This can be achieved by using a predispersion step where the gel is introduced to the binder and the mixture is grinded. Without a predispersion the inventors have found that the need for a dispersion agent increases, probably because the dispersion agent seeks to wet all surfaces, also inside the gel.

The predispersion also has the effect that the water absorption of the dry paint film stabilises more quickly, than if the paint is grinded in one step.

After the predispersion all raw materials are mixed into the paint and the paint is grinded down to approximately 10-20 □m.

Figure 7:
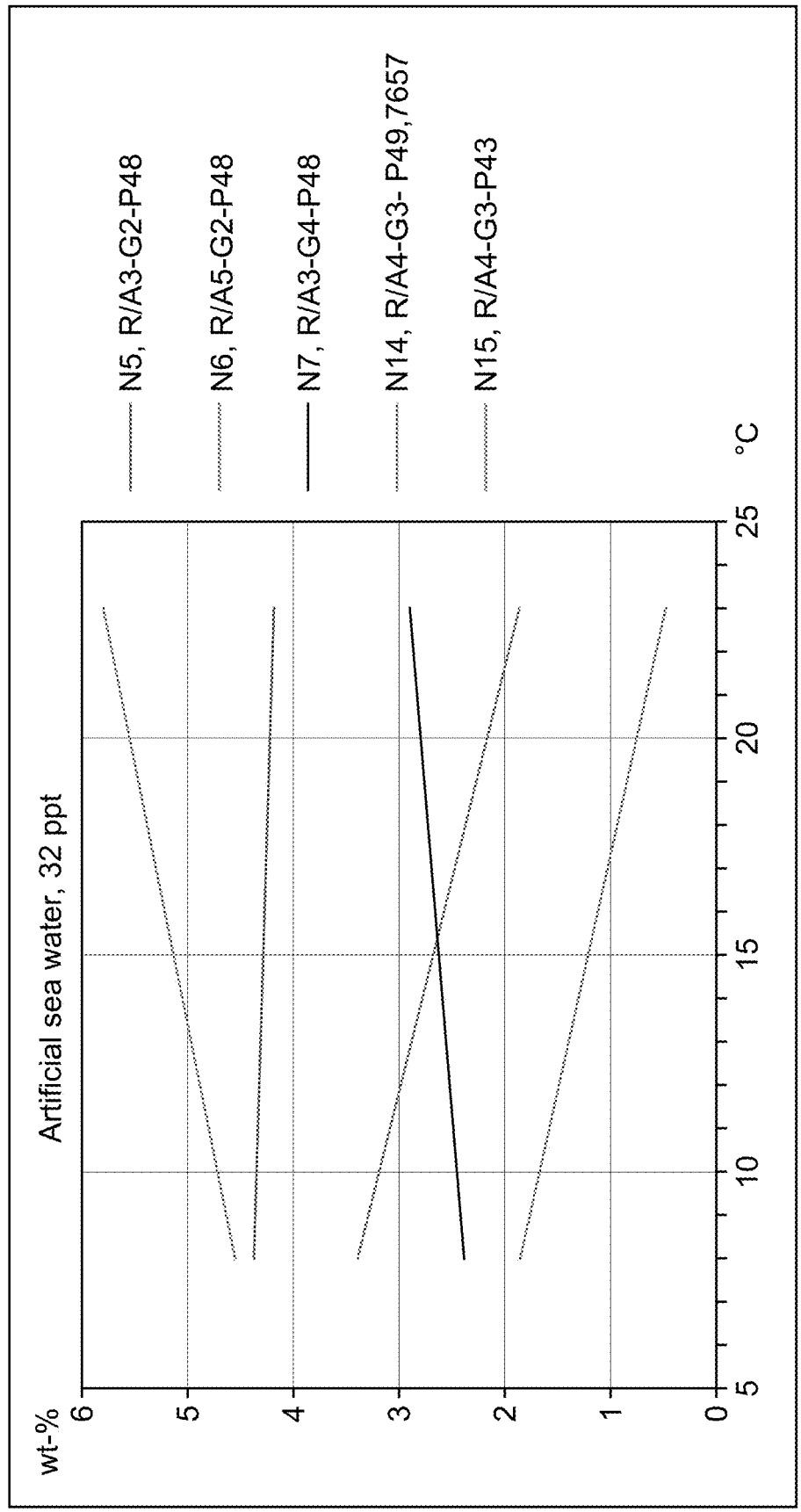
FIG. 7 illustrates the water absorption at 8° C. and 23° C. for 5 anti-fouling formulations at a constant salinity (32 ppt). The loaded aerogel has been kept constant for all formulations, only the amounts of loaded aerogel and other paint composition parameters have been varied. As the figure illustrates, the water absorption of a paint composition can be adjusted radically by changing paint parameters like the R/A (rosin to acrylic) ratio, gel concentration, and Pigment volume concentration.
Figure 8:
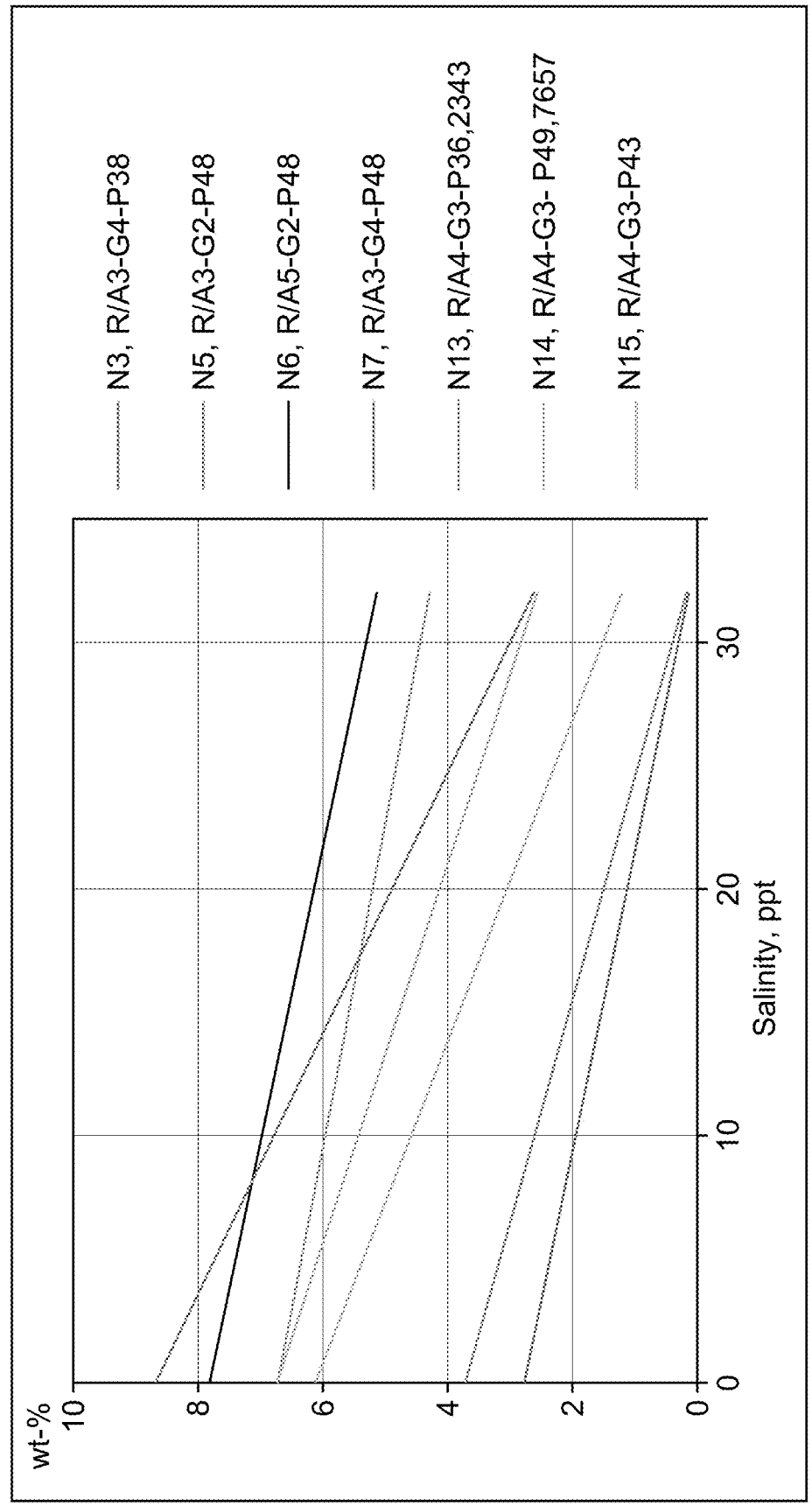
FIG. 8 illustrates the water absorption at 15° C. for different anti-fouling formulations at different salinities (demin. water and artificial sea water). The loaded aerogel has been kept constant for all formulations, only the amounts of loaded aerogel and other paint composition parameters have been varied. As the figure illustrates, the water absorption of a paint composition can be adjusted radically by changing paint parameters like the R/A (rosin to acrylic) ratio, gel concentration, and Pigment volume concentration.
Figure 10:
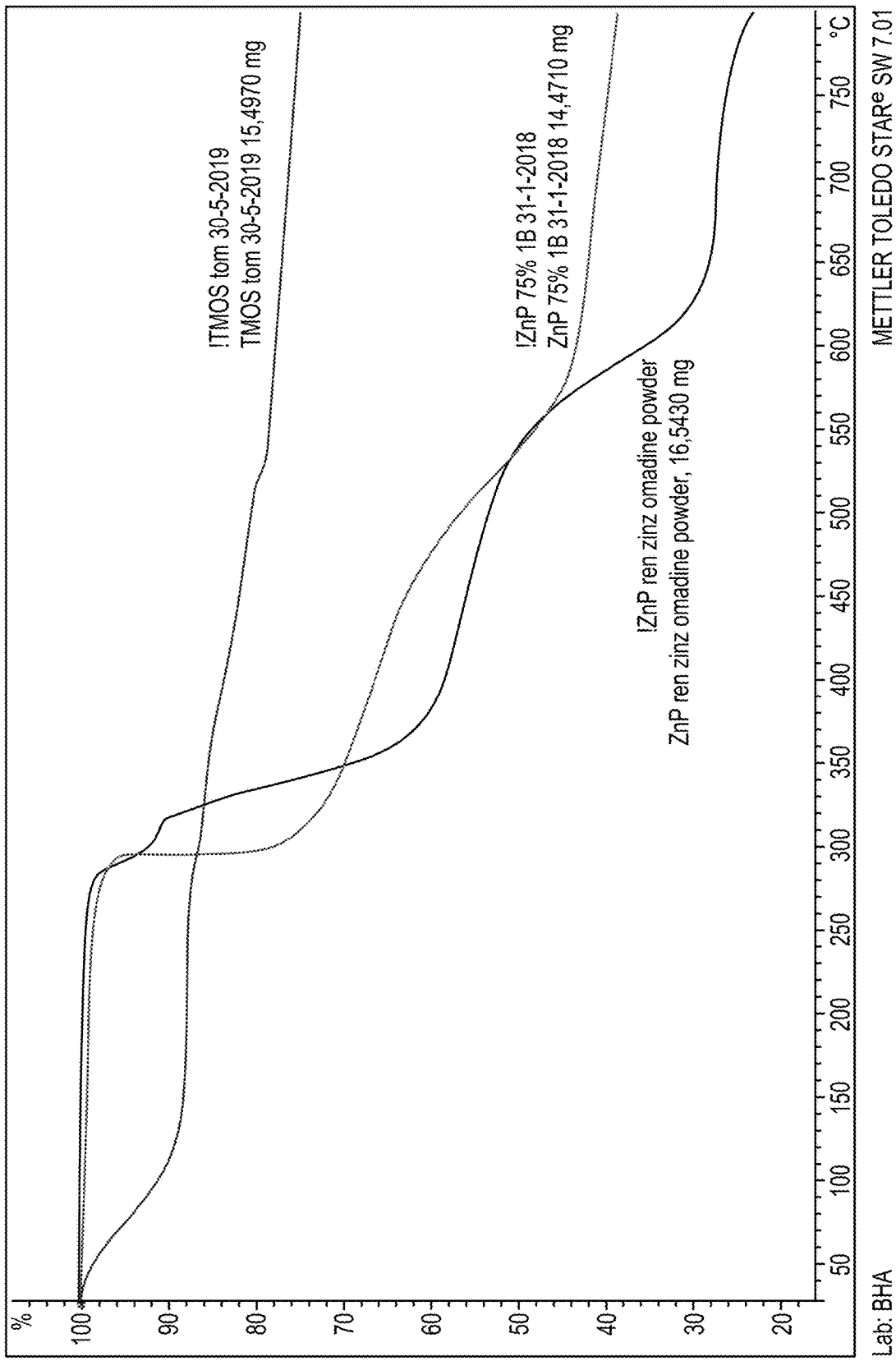
FIGS. 10-13 illustrates the TGA (thermogravimetric) analysis of each of four biocides: ZnP (FIG. 10), CuP (FIG. 11), Econea (FIG. 12) and Copper thiocyanate (FIG. 13). Each figure contains three graphs: The empty aerogel in question, the loaded aerogel and the biocide itself. From these graphs an approximate value for the realised loading can be calculated based on the weight loss of the sample upon heating. It should be noted that the Copper thiocyanate TGA graph in FIG. 13 did not allow for calculation of the loading. Apparently Copper thiocyanate (both in pure form and entrapped) undergoes a chemical reaction which results in an abnormal curve.
Figure 11:
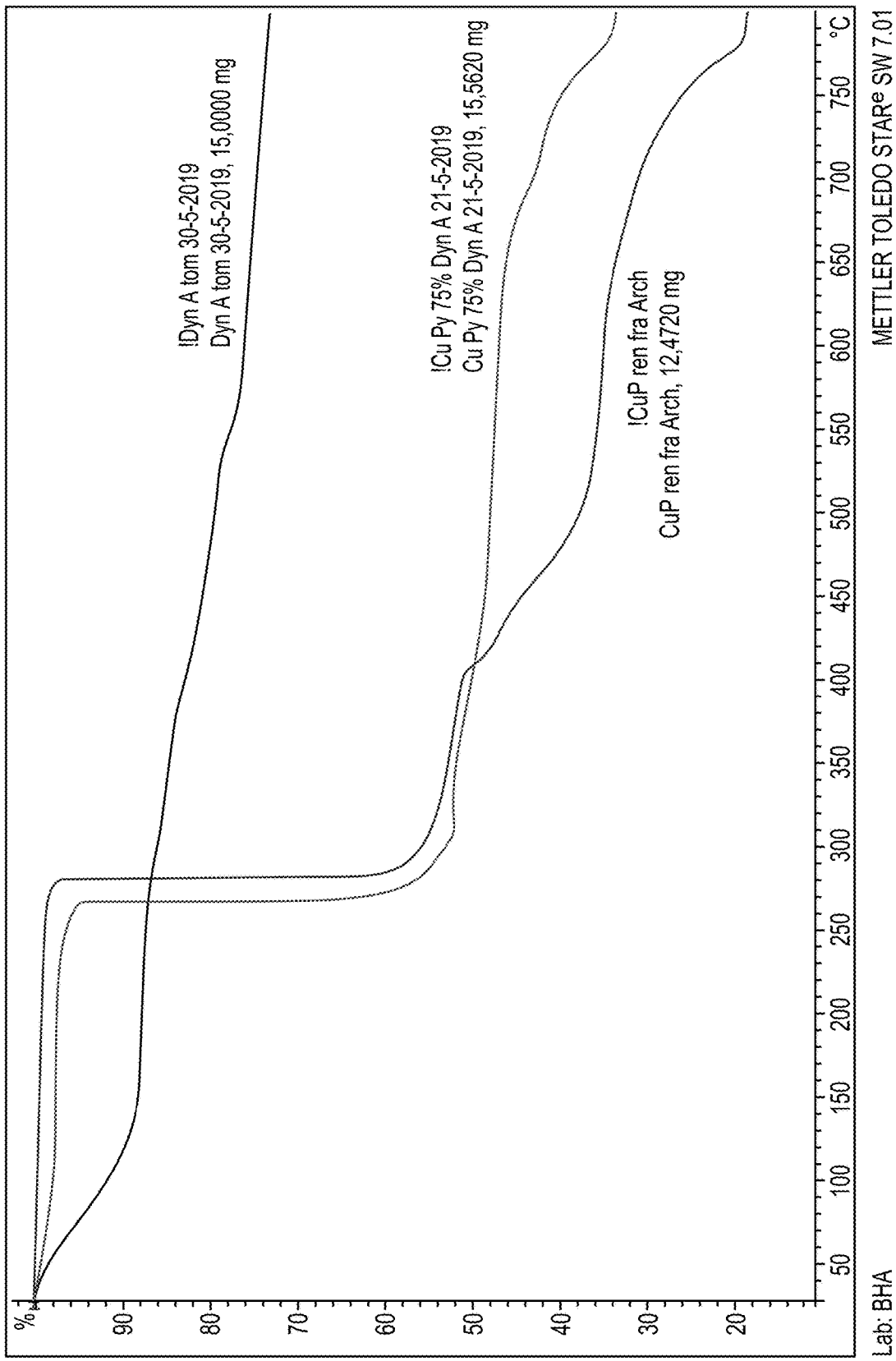
Figure 12:
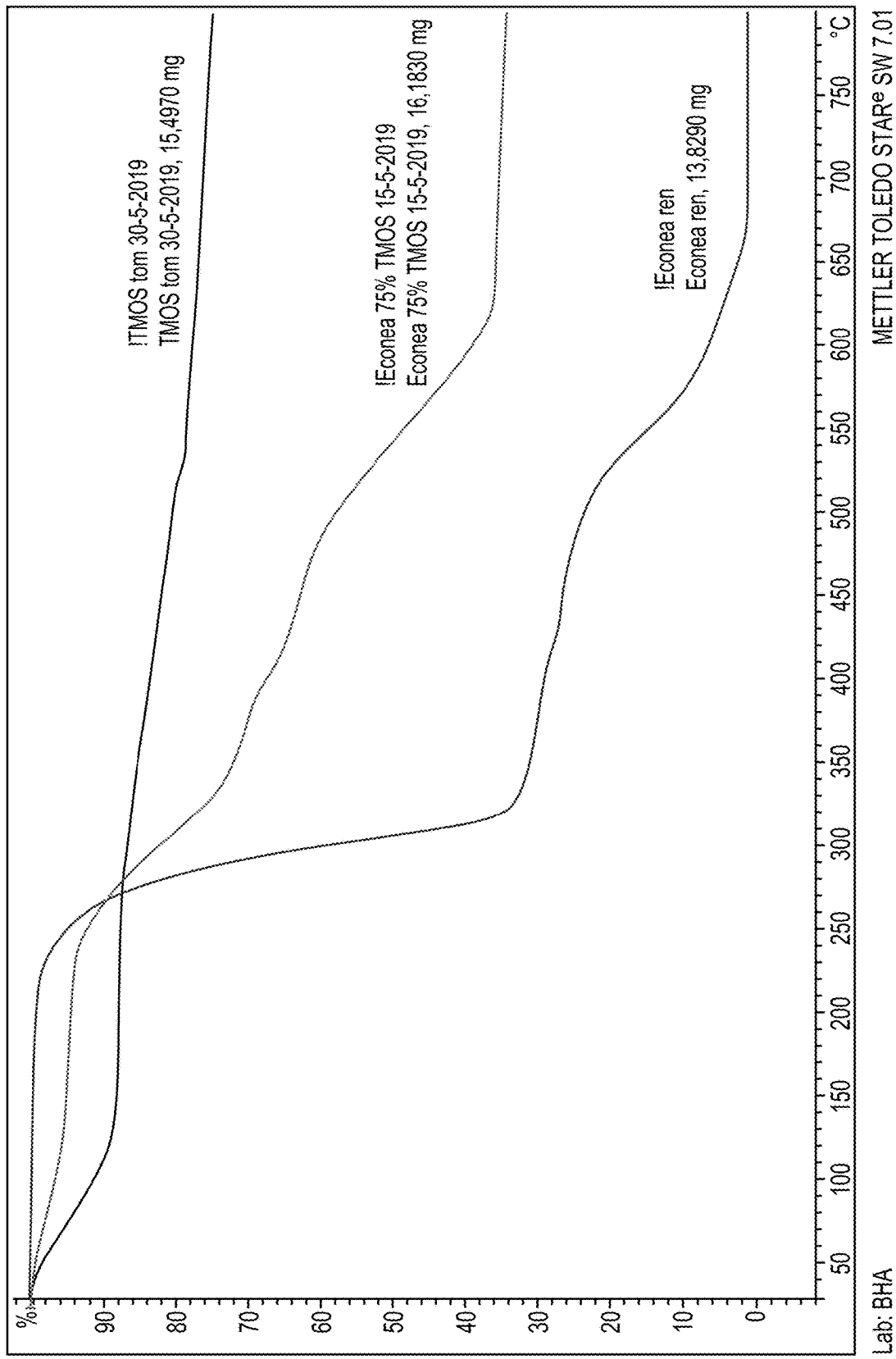

It has been found that both temperature and salinity have a clear influence on the water absorption of the dry coating film, see FIG. 7 and FIG. 8. To find out the relationship between different formulation parameters and these climate parameters, it is very important to understand how to formulate an anti-fouling paint that has a reduced sensitivity towards temperature and salinity to be able to optimize the anti-fouling effect of the biocide.

Below a formulation is given which has been used to evaluate the water adsorption of the dry coating.

| Paint example | Amount weight-% interval |
|---|---|
| 1. Rosin in Xylene (50% binder)) | 33-58 |
| 3. Acrylic resin in xylene (40% binder) | 9-19 |
| Gel with 75% ZnP | 1.6-4.4 |
| Dispersion agent | 0.9-2.3 |
| Iron oxide (red) | 10-23 |
| Barium sulphate | 10-23 |
| Talcum | 1.5-3 |
| Thickener | 0.25-0.6 |

The paints were tested at 8° C. and 23° C. Furthermore, artificial sea water as well as demineralized water was used at both temperatures. It was surprisingly found that the water absorption can both increase and decrease when changing the temperature. The salinity had a decreasing effect when increasing the salinity (FIG. 7 and FIG. 8)

Evaluating the formulation parameters showed surprisingly that both the gel concentration and the Pigment volume concentration (PVC) are very important parameters. The paint formulation used in the experiments was prepared according to the following procedure:
1. Prepare binder solution 1: Rosin 50% in xylene. Stir until completely dissolved.
2. Prepare binder solution 2: Acrylic resin 40% in xylene. Stir until completely dissolved.
3. Mix 36.8 g rosin solution with 2 g gel encapsulated biocide (75% ZnP) according to the present invention in a glass container together with glass beads (ø 3 mm; 25 g/100 g paint formulation). Shake for 15 minutes on a Red Devil shaking machine.
4. Mix in the remaining ingredients:
    a. 8.6 g acrylic binder solution,
    b. 2.3 g dispersion agent,
    c. 23.1 g iron oxide,
    d. 23.1 g Barium sulphate,
    e. 3.5 g Talcum, and
    f. 0.6 g thickener (eg. Luvogel SA1).

Shake on Red Devil 3×15 minutes to a fineness of grind of 20 µm. Let the paint rest and mature for 4 days before applying on a substrate.

Methods Characterization Aerogels
Gel Properties
Mercury Intrusion Analysis
High-pressure mercury (Hg) intrusion analysis was performed in an Autopore V equipment (early measurements: Autopore IV model 9520 or similar) from Micromeritics. The samples were measured in a pressure range from 0.5 psia to 30000 psia, equivalent to a pore size scan between 338 µm to 6.6 nm.
1. All samples were loaded into a penetrometer specifically designed to analyse powder samples (i.e. volume 5 ml, capillary stem volume of 1.13 ml). The amount of sample poured into the penetrometer, was enough to attain a volume stem usage of 20%, which ensures a better resolution of the data.
2. Prior to analysis, the penetrometer with sample was submitted to a degassing treatment, under vacuum, to a set-point limit below 50 µmHg. The samples were then analysed in two different operation modes: low-pressure (up to 40 psia, 17 number of points) and high-pressure (up to 30000 psia, 32 number of points).
3. Once low-pressure analysis is done the penetrometer containing Hg and packed-bed, is weighed again, being the value used as software input to determine the bulk density (i.e. interparticle porosity).
4. Then, the penetrometer is placed into a high-pressure port and while going to higher pressures the intraparticle porosity was determined, being related with apparent density.
5. The pore diameter was calculated using Washburn equation, assuming a contact angle ($\theta$) of 130 degrees and a value of mercury surface tension ($\gamma$) of 0.48 J/m2. Finally, the summary of the data is displayed by the equipment software.

Oil Number
The oil absorption value has been determined for the produced gels, using the method described in DIN 53155/ISO 587/5. The oil absorption value is the quantity of refined linseed oil required to completely wet a definite weight of pigment to form a stiff paste when mechanically mixed (i.e. the number of grammes of oil that it takes to just saturate 100 g of pigment). The value should be regarded as qualitative and has meaning in relation to a preliminary mixer operation. The value is also used to calculate the critical pigment volume concentration. In this case the measured value will be a combination of the wetting of the surface area as well as the penetration of the porous structure.

Water Absorption
A small sample approx. 0.2 grams is weighed in a small petri dish and placed in a desiccator with blue silica gel in the bottom and placed in a climate room.
1. The weight loss of the sample is recorded until stable weight is obtained normally after 4 to 6 days and the dry weight is recorded.
2. The dry sample is placed in a desiccator with tap water in the bottom (approx. 86% RH). The gained weight of the sample is recorded until stable weight is obtained normally after 4 to 6 days.

The weight gained is calculated. This can be expressed as Pore volume=(weight of saturated sample−weight of dried sample)/density of water.
The test is performed in Duplo at 23±2° C.

BET
By BET (Brunauer, Emmett and Teller) analysis, the specific surface area of a sample is measured, including the pore size distribution. The specific surface area of a powder is determined by physical adsorption of a gas on the surface of the solid and by calculating the amount of adsorbate gas corresponding to a monomolecular layer on the surface. Physical adsorption results from relatively weak forces (van der Waals forces) between the adsorbate gas molecules and the adsorbent surface area of the test powder. The determination is usually carried out at the temperature of liquid nitrogen. The amount of gas adsorbed can be measured by a volumetric or continuous flow procedure. Note that this method assumes that gas communicates between the pores and the surrounding volume. In practice, this means that the pores must not be closed cavities. BET equipment used for this study: Micromeritics Gemini series with Micromeritics VacPrep or equivalent drying station. Pore volumes >4*10-6 cm3/g can be measured.

Thermogravimetric (TGA) Measurements
The samples have been analysed in a Mettler Toledo TGA 40. The samples, typically 10-25 mg, are placed in a crucible and weighed. The temperature is raised from room temperature to 800° C. at 10° C./minute. The weight loss is registered. Solvents disappear typically before 250° C., and in connection with gel production typically before 150° C. Other organic material incl. polymers disappear before 450° C. At 800° C. normally only the inorganic material is left. A function control of the equipment is made with Indium to make sure that the temperature profile is within the calibration of the equipment. The weight loss is evaluated using the software program STARe version 7.01.

Maritime Anti-Fouling Paint

The water absorption of the paint film is a critical parameter connected to leaching layer, leaching of the active compound, polishing rate and thus anti-fouling properties. Water absorption is influenced by the choice of pigmentation, the chosen gel and the amount of gel. The aerogels are very porous and an equilibrium between the different components has to be achieved before valid measurements can be performed. It has been shown that the binder system penetrates the aerogel, which reduces the water absorption until the equilibrium between the components is attained, and also assures that the aerogel particles are securely fastened in the paint layer and not washed out over time by exposure to water. It is assumed that gels with high intrusion volume values (as measured by mercury poromesitry) can easier be penetrated by the binder system. In sea water the gel will be hydrolysed over time and thus contribute to the polishing properties of the paint film.

The invention claimed is:

1. A method for preventing fouling of a marine surface, comprising painting the surface with a paint including an anti-fouling additive comprising an inorganic, silica-containing aerogel comprising
   a. a porous gel lattice, and
   b. optionally an alcoxide comprising at least one of Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu, and
   c. one or more biocidal or biorepellant compounds entrapped in said silica containing aerogel, wherein said silica-containing aerogel comprises at least 60% by weight of the one or more biocidal or biorepellant compounds, and one or more biocidal or biorepellant compounds are entrapped within the silica containing aerogel during formation of the porous gel lattice, and wherein the bulk density of said silica containing aerogel has a value of at most 0.5 gr/ml when said silica containing aerogel comprises at most 75% by weight Zn pyrithione, the paint absorbing between 1.5% and 6% water by weight when the dry paint film is immersed in artificial seawater having salinity of 31-35 ppt and a pH between 7.8-8.2.

2. The method of claim 1 wherein the silica-containing aerogel comprises at least 65% by weight of the one or more biocidal or biorepellant compounds.

3. A method according to claim 1 wherein the anti-fouling additive comprises at least 75% by weight of the one or more biocidal or biorepellant compounds.

4. A method according to claim 3, wherein the one or more biocidal or biorepellant compounds are a member selected from the group consisting of pyrithione compounds, basic copper carbonate, isothiazolinone compounds, substituted triazines, carbamates, chlorinated aromatic ureas, triazoles and combinations thereof.

5. A method according to claim 3 where in the one or more biocidal or biorepellant compounds are a member selected from the group consisting of zinc pyrithione, copper pyrithione, copper thiocyanate, tolyofluanid, dichlorfluanid, 4,5-dichloro-2-n-octyl-4-isothiazolin-3-one, zinc ethylenebisthiocarbamate and 2-(p-chlorophenyl)-3-cyano-4-bromo-5-trifluoromethyl pyrrole.

6. A method according to claim 3, wherein the one or more biocidal or biorepellant compounds are selected from copper pyrithione or zinc pyrithione.

7. The method according to claim 1 wherein the anti-fouling additive comprises at least 80% by weight of the one or more biocidal or biorepellant compounds.

8. A method according to claim 7, wherein the one or more biocidal or biorepellant compounds are selected from copper pyrithione or zinc pyrithione.

9. A method according to claim 1 wherein the one or more biocidal or biorepellant compounds are a member selected from the group consisting of pyrithione compounds, basic copper carbonate, isothiazolinone compounds, substituted triazines, carbamates, chlorinated aromatic ureas, triazoles and combinations thereof.

10. A method according to claim 9 where in the one or more biocidal or biorepellant compounds are a member selected from the group consisting of zinc pyrithione, copper pyrithione, copper thiocyanate, tolyofluanid, dichlorfluanid, 4,5-dichloro-2-n-octyl-4-isothiazolin-3-one, zinc ethylenebisthiocarbamate and 2-(p-chlorophenyl)-3-cyano-4-bromo-5-trifluoromethyl pyrrole.

11. A method according to claim 9, wherein the one or more biocidal or biorepellant compounds are selected from copper pyrithione or zinc pyrithione.

12. A method according to claim 1 wherein the one or more biocidal or biorepellant compounds are a member selected from the group consisting of zinc pyrithione, copper pyrithione, copper thiocyanate, tolyofluanid, dichlorfluanid, 4,5-dichloro-2-n-octyl-4-isothiazolin-3-one, zinc ethylenebisthiocarbamate and 2-(p-chlorophenyl)-3-cyano-4-bromo-5-trifluoromethyl pyrrole.

13. A method according to claim 1, wherein the one or more biocidal or biorepellant compounds are selected from copper pyrithione or zinc pyrithione.

14. The method according to claim 1 wherein the paint further comprises a pigment.

15. The method of claim 1 wherein the marine surface comprises a boat hull.

16. Antifouling paint composition comprising a pigment and an anti-fouling additive comprising an inorganic, silica-containing aerogel comprising
    a. a porous gel lattice,
    b. optionally an alcoxide comprising Sc Sc, Ti, V, Cr, Mn, Fe, Co, Y, Zr, Nb, Ru, Hf, Ta, W, Re Al, Ge, In, La, Pr, Nd, Sm, Eu, Gd, Tb, Dy, Ho, Er, Tm, Yb or Lu, and one or more biocidal or biorepellant compounds entrapped in said aerogel, wherein said silica-containing aerogel comprises at least 60% by weight of the one or more biocidal or biorepellant compounds entrapped within the silica aerogel and wherein the bulk density of said silica containing aerogel has a value of at most 0.5 gr/ml when said silica containing aerogel comprises at most 75% by weight Zn pyrithione, the paint composition absorbing between 1.5% and 6% water by weight when the dry paint film is immersed in artificial seawater having salinity of 31-35 ppt and a pH between 7.8-8.2.

17. The antifouling paint composition of claim 16 wherein the one or more biocidal or biorepellant compounds are entrapped within the silica containing aerogel during formation of the porous gel lattice.

18. The antifouling paint composition of claim 16 wherein the silica containing aerogel particles comprise at least 65% by weight entrapped biocides or biorepellents.

19. The antifouling paint composition of claim 16 wherein the silica containing aerogel particles comprise at least 80% by weight encapsulated biocides or biorepellents.

20. The antifouling paint composition of claim 16 wherein the silica containing aerogel particles comprise at least 85% by weight encapsulated biocides or biorepellents.

* * * * *